US011768695B2

(12) United States Patent
Lal et al.

(10) Patent No.: US 11,768,695 B2
(45) Date of Patent: Sep. 26, 2023

(54) METHODS AND APPARATUS TO DEPLOY A HYBRID WORKLOAD DOMAIN

(71) Applicant: VMware Inc., Palo Alto, CA (US)

(72) Inventors: Naren Lal, Bangalore (IN);
Ranganathan Srinivasan, Bangalore (IN)

(73) Assignee: VMware, Inc., Palo Alto, CA (US)

(*) Notice: Subject to any disclaimer, the term of this patent is extended or adjusted under 35 U.S.C. 154(b) by 142 days.

(21) Appl. No.: 17/114,446

(22) Filed: Dec. 7, 2020

(65) Prior Publication Data

US 2021/0089344 A1 Mar. 25, 2021
US 2023/0195483 A9 Jun. 22, 2023

Related U.S. Application Data

(63) Continuation of application No. 16/297,786, filed on Mar. 11, 2019, now Pat. No. 10,860,362.

(30) Foreign Application Priority Data

Jan. 9, 2019 (IN) .............................. 201941001028

(51) Int. Cl.
*G06F 9/455* (2018.01)
*H04L 67/1008* (2022.01)

(52) U.S. Cl.
CPC ...... *G06F 9/45558* (2013.01); *G06F 9/45541* (2013.01); *G06F 9/45545* (2013.01); *H04L 67/1008* (2013.01); *G06F 2009/4557* (2013.01)

(58) Field of Classification Search
CPC ............. G06F 9/45558; G06F 9/45541; G06F 9/45545; G06F 2009/4557; H04L 67/1008
See application file for complete search history.

(56) References Cited

U.S. PATENT DOCUMENTS 10,860,362 B2 12/2020 Lal et al.
2011/0126207 A1* 5/2011 Wipfel .................... H04L 63/08
718/104

(Continued)

OTHER PUBLICATIONS

Fujitsu, Dynamic Server Infrastructure—Design Guide, Fujitsu Technology Solutions, 2009, 8 pages.*

(Continued)

*Primary Examiner* — Diem K Cao
(74) *Attorney, Agent, or Firm* — Hanley, Flight & Zimmerman, LLC

(57) ABSTRACT

Methods and apparatus are disclosed that deploy a hybrid workload domain. An example apparatus includes a resource discoverer to determine whether a first bare metal server is available and a resource allocator to allocate virtual servers for a virtual server pool based on an availability of the virtual servers and, when the first bare metal server is available, allocate the first bare metal server for a bare metal server pool. The example apparatus further includes a hybrid workload domain generator to generate, for display in a user interface, a combination of the virtual server pool and the bare metal server pool and generate a hybrid workload domain used to run a user application based on a user selection in a user interface, the hybrid workload domain including virtual servers from the virtual server pool and bare metal servers from the bare metal server pool.

20 Claims, 8 Drawing Sheets

(56) References Cited

U.S. PATENT DOCUMENTS

2013/0086268 A1\* 4/2013 Sloma .................... G06F 9/50
709/226
2013/0268940 A1 10/2013 Gmach et al.
2016/0110227 A1 4/2016 Ono
2017/0149931 A1\* 5/2017 Lochhead ........... H04L 41/0896

OTHER PUBLICATIONS

IBM, "Bare Metal Servers: Resources," retrieved from https://www.ibm.com/in-en/cloud/bare-metal-servers/resources#product, on Aug. 20, 2019, (3 pages).

Hewlett Packard Enterprise, "HPE Oneview," retrieved from https://buy.hpe.com/b2c/us/en/software/converged-infrastructure-management-software/converged-infrastructure-management/oneview-management-software/hpe-oneview/p/5410258, on Aug. 20, 2019, (4 pages).

United States Patent and Trademark Office, "Notice of Allowance and Fee(s) Due," issued in connection with U.S. Appl. No. 16/297,786, dated Aug. 3, 2020 (8 pages).

\* cited by examiner

METHODS AND APPARATUS TO DEPLOY A HYBRID WORKLOAD DOMAIN

RELATED APPLICATION

This patent arises from a continuation of U.S. patent application Ser. No. 16/297,786, (Now U.S. Pat. No. 10,860, 362) which was filed on Mar. 11, 2019. U.S. patent application Ser. No. 16/297,786 is hereby incorporated herein by reference in its entirety. Priority to U.S. patent application Ser. No. 16/297,786 is hereby claimed.

FIELD OF THE DISCLOSURE

This disclosure relates generally to workload domains and, more particularly, to methods and apparatus to deploy a hybrid workload domain.

BACKGROUND

Virtualizing computer systems provides benefits such as the ability to execute multiple computer systems on a single hardware computer, replicating computer systems, moving computer systems among multiple hardware computers, and so forth. "Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace.

Cloud computing environments may be composed of many processing units (e.g., servers, computing resources, etc.). The processing units may be installed in standardized frames, known as racks, which provide efficient use of floor space by allowing the processing units to be stacked vertically. The racks may additionally include other components of a cloud computing environment such as storage devices, networking devices (e.g., routers, switches, etc.), etc.

The processing units installed in the racks may further be used to run applications directly. For example, a physical server may be dedicated to a single tenant (e.g., an administrator renting a physical server), allowing the tenant to maintain singular control over the resources of the server, such as compute, storage, and other resources. Such physical servers are referred to as bare metal servers.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
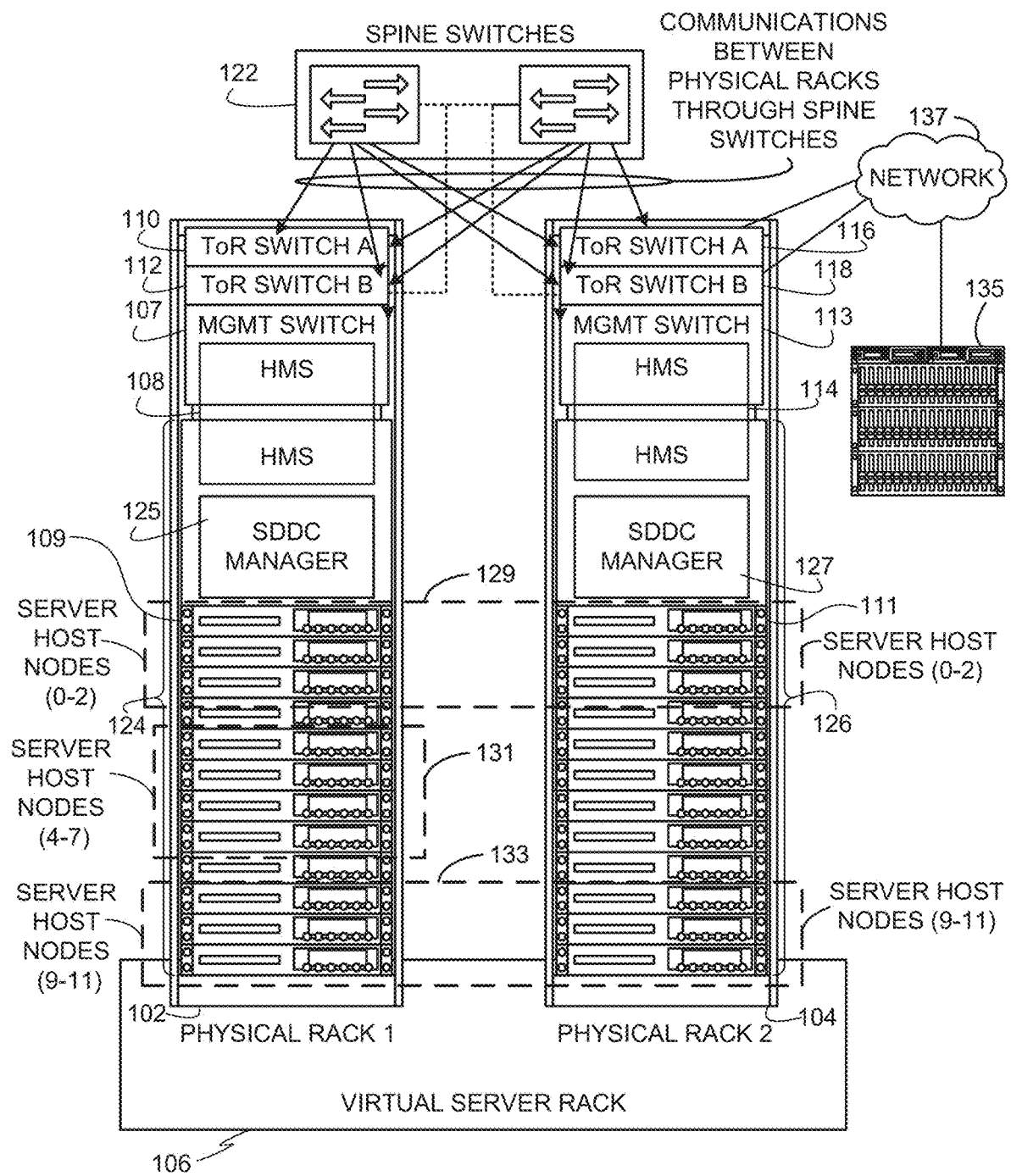
FIG. 1 illustrates example physical racks in an example virtual server rack deployment.

Cloud computing is based on the deployment of many physical resources across a network, virtualizing the physical resources into virtual resources, and provisioning the virtual resources in software defined data centers (SDDCs) for use across cloud computing services and applications. Examples disclosed herein can be used to manage network resources in SDDCs to improve performance and efficiencies of network communications between different virtual and/or physical resources of the SDDCs.

Examples disclosed herein can be used in connection with different types of SDDCs. In some examples, techniques disclosed herein are useful for managing network resources that are provided in SDDCs based on Hyper-Converged Infrastructure (HCI). In some examples, HCI combines a virtualization platform such as a hypervisor, virtualized software-defined storage, and virtualized networking in an SDDC deployment. An SDDC manager can provide automation of workflows for lifecycle management and operations of a self-contained private cloud instance. Such an instance may span multiple racks of servers connected via a leaf-spine network topology and connects to the rest of the enterprise network for north-south connectivity via well-defined points of attachment. The leaf-spine network topology is a two-layer data center topology including leaf switches (e.g., switches to which servers, load balancers, edge routers, storage resources, etc., connect) and spine switches (e.g., switches to which leaf switches connect, etc.). In such a topology, the spine switches form a backbone of a network, where every leaf switch is interconnected with each and every spine switch.

Examples disclosed herein can be used with one or more different types of virtualization environments. Three example types of virtualization environments are: full virtualization, paravirtualization, and operating system (OS) virtualization. Full virtualization, as used herein, is a virtualization environment in which hardware resources are managed by a hypervisor to provide virtual hardware resources to a virtual machine (VM). In a full virtualization environment, the VMs do not have access to the underlying hardware resources. In a typical full virtualization, a host OS with embedded hypervisor (e.g., a VMWARE® ESXI® hypervisor, etc.) is installed on the server hardware. VMs including virtual hardware resources are then deployed on the hypervisor. A guest OS is installed in the VM. The hypervisor manages the association between the hardware resources of the server hardware and the virtual resources allocated to the VMs (e.g., associating physical random-access memory (RAM) with virtual RAM, etc.). Typically, in full virtualization, the VM and the guest OS have no visibility and/or access to the hardware resources of the underlying server. Additionally, in full virtualization, a full guest OS is typically installed in the VM while a host OS is installed on the server hardware. Example virtualization environments include VMWARE® ESX® hypervisor, Microsoft HYPER-V® hypervisor, and Kernel Based Virtual Machine (KVM).

Paravirtualization, as used herein, is a virtualization environment in which hardware resources are managed by a hypervisor to provide virtual hardware resources to a VM, and guest OSs are also allowed to access some or all the underlying hardware resources of the server (e.g., without accessing an intermediate virtual hardware resource, etc.). In a typical paravirtualization system, a host OS (e.g., a Linux-based OS, etc.) is installed on the server hardware. A hypervisor (e.g., the XEN® hypervisor, etc.) executes on the host OS. VMs including virtual hardware resources are then deployed on the hypervisor. The hypervisor manages the association between the hardware resources of the server hardware and the virtual resources allocated to the VMs (e.g., associating RAM with virtual RAM, etc.). In paravirtualization, the guest OS installed in the VM is also configured to have direct access to some or all of the hardware resources of the server. For example, the guest OS can be precompiled with special drivers that allow the guest OS to access the hardware resources without passing through a virtual hardware layer. For example, a guest OS can be precompiled with drivers that allow the guest OS to access a sound card installed in the server hardware. Directly accessing the hardware (e.g., without accessing the virtual hardware resources of the VM, etc.) can be more efficient, can allow for performance of operations that are not supported by the VM and/or the hypervisor, etc.

OS virtualization is also referred to herein as container virtualization. As used herein, OS virtualization refers to a system in which processes are isolated in an OS. In a typical OS virtualization system, a host OS is installed on the server hardware. Alternatively, the host OS can be installed in a VM of a full virtualization environment or a paravirtualization environment. The host OS of an OS virtualization system is configured (e.g., utilizing a customized kernel, etc.) to provide isolation and resource management for processes that execute within the host OS (e.g., applications that execute on the host OS, etc.). The isolation of the processes is known as a containerization. Thus, a process executes within a container that isolates the process from other processes executing on the host OS. In this manner, OS virtualization can be used to provide isolation and resource management capabilities without the resource overhead utilized by a full virtualization environment or a paravirtualization environment. Example OS virtualization environments include Linux Containers LXC and LXD, the DOCKER™ container platform, the OPENVZ™ container platform, etc.

In some examples, a data center (or pool of linked data centers) can include multiple different virtualization environments. For example, a data center can include hardware resources that are managed by a full virtualization environment, a paravirtualization environment, an OS virtualization environment, etc., and/or a combination thereof. In such a data center, a workload can be deployed to any of the virtualization environments. In some examples, techniques to monitor both physical and virtual infrastructure provide visibility into the virtual infrastructure (e.g., VMs, virtual storage, virtual or virtualized networks and their control/management counterparts, etc.) and the physical infrastructure (e.g., servers, physical storage, network switches, etc.).

Examples disclosed herein can be employed with HCI-based SDDCs deployed using virtual server rack systems such as the virtual server rack 106 of FIG. 1. A virtual server rack system can be managed using a set of tools that is accessible to all modules of the virtual server rack system. Virtual server rack systems can be configured in many different sizes. Some systems are as small as four hosts, and other systems are as big as tens of racks. As described in more detail below in connection with FIGS. 1 and 2, multi-rack deployments can include Top-of-the-Rack (ToR) switches (e.g., leaf switches, etc.) and spine switches connected using a Leaf-Spine architecture. A virtual server rack system also includes software-defined data storage (e.g., storage area network (SAN), VMWARE® VIRTUAL SAN™, etc.) distributed across multiple hosts for redundancy and virtualized networking software (e.g., VMWARE NSX™, etc.).

As used herein, availability refers to the percentage of continuous operation that can be expected for a requested duration of operation of a workload domain. The level of availability can be increased or decreased based on amounts of redundancy of components (e.g., switches, hosts, VMs, containers, etc.). As used herein, performance refers to the computer processing unit (CPU) operating speeds (e.g., CPU gigahertz (GHz)), memory (e.g., gigabytes (GB) of random access memory (RAM)), mass storage (e.g., GB hard drive disk (HDD), GB solid state drive (SSD), etc.), and power capabilities of a workload domain. As used herein, capacity refers to the aggregate number of resources (e.g., aggregate storage, aggregate CPU, aggregate respective hardware accelerators (e.g., field programmable gate arrays (FPGAs), graphic processing units (GPUs)), etc.) across all servers associated with a cluster and/or a workload domain. In examples disclosed herein, the number of resources (e.g., capacity) for a workload domain is determined based on the redundancy, the CPU operating speed, the memory, the storage, the security, and/or the power requirements selected by a user. For example, more resources are required for a workload domain as the user-selected requirements increase (e.g., higher redundancy, CPU speed, memory, storage, security, and/or power options require more resources than lower redundancy, CPU speed, memory, storage, security, and/or power options). In some such examples, the user-selected requirements may be based on an application that a user (e.g., an administrator) wishes to run using the workload domain. In some examples, resources are computing devices with set amounts of storage, memory, CPUs, etc. In some examples, resources are individual devices (e.g., hard drives, processors, memory chips, etc.).

Processing units (e.g., servers, computing resources, etc.) may be installed in standardized frames, known as racks, which provide efficient use of floor space by allowing the processing units to be stacked vertically in the racks. In some examples, the processing units may be used to run applications directly. For example, a physical server may be dedicated to a single tenant (e.g., a user or administrator renting the physical server), allowing the tenant to maintain singular control over the resources of the server, such as compute, storage, and other resources. Such physical servers are also referred to herein as bare metal servers. On bare metal servers, an operating system is installed directly on the server. Bare metal servers are able to produce constant, high levels of compute resources because the bare metal server does not use a hypervisor, thus eliminating the drain on the resources (e.g., of a virtual server) caused by the hypervisor (e.g., a hypervisor may use a majority of available resources and cause performance issues for other applications running on a shared infrastructure). Bare metal resources further advantageously improve security by physically segregating resources (e.g., different tenants use different physical servers).

Applications that prioritize scalability (e.g., increasing or decreasing compute resources as needed) and flexibility (e.g., enabling applications to be accessed remotely) are typically configured using virtual compute resources. On the other hand, applications that prioritize performance and have a constant, high demand for compute resources are typically configured on bare metal compute resources. For example, bare metal servers are used for game servers and transcoding applications, as well as for maintaining large relational databases, as these applications exhibit constant, high demand for compute resources. In some examples, an application is a product being executed or a workload being deployed (e.g., by an administrator) on a workload domain (e.g., a hybrid workload domain). For example, applications may include Facebook®, an ecommerce website, a credit card server, etc.

Known workload domains are configured completely on virtualized compute (e.g., using VMWARE VCENTER™). For example, a workload domain is created for a specified application based on compute, network, and storage requirements of the application. In some known examples, an application or component of the application demands high and/or constant compute resources, and a datacenter administrator configures and manages bare metal compute resources to be used for the application. Known methods for bringing bare metal resources under management of the datacenter administrator include using a different set of software to configure and manage the bare metal compute resources than the software used to configure and manage the virtual resources. Thus, the datacenter administrator operates two different sets of management software to manage the application. Such known methods inhibit proper utilization of all of the resources (e.g., both virtual and physical resources) and reduce the ability of the administrator to manage and troubleshoot problems that occur in a workload domain. Accordingly, a solution is desired that allows a datacenter administrator to manage a hybrid workload domain that includes a combination of virtual servers and bare metal servers.

Examples disclosed herein create a hybrid workload domain that combines virtual resources from virtual servers (e.g., compute resources, memory, storage, etc. of a virtual server or servers) and bare metal resources from bare metal servers (e.g., compute resources, memory, storage, etc. of a bare metal server or servers) based on an application that is to be executed using the hybrid workload domain and/or based on instructions from a datacenter administrator. The disclosed examples configure applications or components of applications that prioritize flexibility and/or scalability on virtual servers and configure applications and/or components of applications that prioritize a high and/or constant demand of resources on bare metal servers. Thus, the hybrid workload domain is capable of combining resources (e.g., virtual compute resources and bare metal compute resources) to run applications through a single workload domain while handling both the flexibility and scalability desired for some components of applications with the high, constant demand of resources desired for other components of the applications. The examples disclosed herein thus allow an administrator to manage all resources from a single point, provide a consolidated view of a configuration of the hybrid workload domain, properly utilize all available resources, and simplify management and troubleshooting of the hybrid workload domain.

In some examples disclosed herein, virtual servers are allocated for a virtual server pool and bare metal servers are allocated for a bare metal server pool. Further, in some examples disclosed herein, a display of a combination of the virtual server pool and the bare metal server pool is displayed in a user interface for a user or administrator. In such examples, a hybrid workload domain including virtual servers from the virtual server pool and bare metal servers from the bare metal server pool is generated to run a user application (e.g., an application defined by the user or administrator) based on a user selection in a user interface. For example, the user or administrator may select virtual servers and/or bare metal servers in the user interface that are used to generate the hybrid workload domain.

In some examples disclosed herein, the bare metal servers are queried to determine whether each bare metal server is available to be added to the bare metal server pool. Further, in some such examples, a bare metal server that is not available is forcibly acquired by bringing the bare metal server under management of an administrator, even though the bare metal server was previously being used in another application. For example, an administrator may authorize the forced acquisition of the bare metal server, and the bare metal server may be brought under management of the administrator and added to the bare metal server pool. In some examples, the user interface may display details of the virtual servers included in the virtual server pool (e.g., compute resource details, storage details, memory details, etc.) and details of the bare metal servers included in the bare metal server pool (e.g., compute resource details, storage details, memory details, etc.).

FIG. 1 illustrates example physical racks 102, 104 in an example deployment of a virtual server rack 106. The virtual server rack 106 of the illustrated example enables abstracting hardware resources (e.g., physical hardware resources 124, 126, etc.). In some examples, the virtual server rack 106 includes a set of physical units (e.g., one or more racks, etc.) with each unit including hardware such as server nodes (e.g., compute+storage+network links, etc.), network switches, and, optionally, separate storage units. From a user perspective, the example virtual server rack 106 is an aggregated pool of logic resources exposed as one or more VMWARE ESXI™ clusters along with a logical storage pool and network connectivity. As used herein, the term "cluster" refers to a server group in a virtual environment. For example, a VMWARE ESXI™ cluster is a group of physical servers in the physical hardware resources that run VMWARE ESXI™ hypervisors to virtualize processor, memory, storage, and networking resources into logical resources to run multiple VMs that run OSs and applications as if those OSs and applications were running on physical hardware without an intermediate virtualization layer.

In the illustrated example, the first physical rack 102 has an example ToR switch A 110, an example ToR switch B 112, an example management switch 107, and an example server host node (0) 109. In the illustrated example, the management switch 107 and the server host node (0) 109 run a hardware management system (HMS) 108 for the first physical rack 102. The second physical rack 104 of the illustrated example is also provided with an example ToR switch A 116, an example ToR switch B 118, an example management switch 113, and an example server host node (0) 111. In the illustrated example, the management switch 113 and the server host node (0) 111 run an HMS 114 for the second physical rack 104.

In the illustrated example, the HMS 108, 114 connects to server management ports of the server host node (0) 109, 111 (e.g., using a baseboard management controller (BMC), etc.), connects to ToR switch management ports (e.g., using 1 gigabits per second (Gbps) links, 10 Gbps links, etc.) of the ToR switches 110, 112, 116, 118, and also connects to spine switch management ports of one or more spine switches 122. In some examples, the spine switches 122 can be powered on or off via an SDDC manager 125, 127 and/or the HMS 108, 114 based on a type of network fabric being used. In the illustrated example, the ToR switches 110, 112, 116, 118, implement leaf switches such that the ToR switches 110, 112, 116, 118, and the spine switches 122 are in communication with one another in a leaf-spine switch configuration. These example connections form a non-routable private IP management network for out-of-band (OOB) management. The HMS 108, 114 of the illustrated example uses this OOB management interface to the server management ports of the server host node (0) 109, 111 for server hardware management. In addition, the HMS 108, 114 of the illustrated example uses this OOB management interface to the ToR switch management ports of the ToR switches 110, 112, 116, 118 and to the spine switch management ports of the one or more spine switches 122 for switch management.

In the illustrated example, the ToR switches 110, 112, 116, 118 connect to server NIC ports (e.g., using 10 Gbps links, etc.) of server hosts in the physical racks 102, 104 for downlink communications and to the spine switch(es) 122 (e.g., using 40 Gbps links, etc.) for uplink communications. In the illustrated example, the management switch 107, 113 is also connected to the ToR switches 110, 112, 116, 118 (e.g., using a 10 Gbps link, etc.) for internal communications between the management switch 107, 113 and the ToR switches 110, 112, 116, 118. Also in the illustrated example, the HMS 108, 114 is provided with in-band (IB) connectivity to individual server nodes (e.g., server nodes in example physical hardware resources 124, 126, etc.) of the physical rack 102, 104. In the illustrated example, the IB connection interfaces to physical hardware resources 124, 126 via an OS running on the server nodes using an OS-specific application programming interface (API) such as VMWARE VSPHERE® API, command line interface (CLI), and/or interfaces such as Common Information Model from Distributed Management Task Force (DMTF).

Example OOB operations performed by the HMS 108, 114 include discovery of new hardware, bootstrapping, remote power control, authentication, hard resetting of non-responsive hosts, monitoring catastrophic hardware failures, and firmware upgrades. The example HMS 108, 114 uses IB management to periodically monitor status and health of the physical hardware resources 124, 126 and to keep server objects and switch objects up to date. Example IB operations performed by the HMS 108, 114 include controlling power state, accessing temperature sensors, controlling Basic Input/Output System (BIOS) inventory of hardware (e.g., CPUs, memory, disks, etc.), event monitoring, and logging events.

The HMSs 108, 114 of the corresponding physical racks 102, 104 interface with the software-defined data center (SDDC) managers 125, 127 of the corresponding physical racks 102, 104 to instantiate and manage the virtual server rack 106 using the physical hardware resources 124, 126 (e.g., processors, NICs, servers, switches, storage devices, peripherals, power supplies, etc.) of the physical racks 102, 104. In the illustrated example, the SDDC manager 125 of the first physical rack 102 runs on a cluster of three server host nodes of the first physical rack 102, one of which is the server host node (0) 109. In some examples, the term "host" refers to a functionally indivisible unit of the physical hardware resources 124, 126, such as a physical server that is configured or allocated, as a whole, to a virtual rack and/or workload; powered on or off in its entirety; or may otherwise be considered a complete functional unit. Also in the illustrated example, the SDDC manager 127 of the second physical rack 104 runs on a cluster of three server host nodes of the second physical rack 104, one of which is the server host node (0) 111.

In the illustrated example, the SDDC managers 125, 127 of the corresponding physical racks 102, 104 communicate with each other through one or more spine switches 122. Also in the illustrated example, communications between physical hardware resources 124, 126 of the physical racks 102, 104 are exchanged between the ToR switches 110, 112, 116, 118 of the physical racks 102, 104 through the one or more spine switches 122. In the illustrated example, each of the ToR switches 110, 112, 116, 118 is connected to each of two spine switches 122. In other examples, fewer or more spine switches may be used. For example, additional spine switches may be added when physical racks are added to the virtual server rack 106.

The SDDC manager 125 of the first physical rack 102 runs on a cluster of three server host nodes of the first physical rack 102 using a high availability (HA) mode configuration. In addition, the SDDC manager 127 of the second physical rack 104 runs on a cluster of three server host nodes of the second physical rack 104 using the HA mode configuration. Using the HA mode in this manner, enables fault tolerant operation of the SDDC manager 125, 127 in the event that one of the three server host nodes in the cluster for the SDDC manager 125, 127 fails. Upon failure of a server host node executing the SDDC manager 125, 127, the SDDC manager 125, 127 can be restarted to execute on another one of the hosts in the cluster. Therefore, the SDDC manager 125, 127 continues to be available even in the event of a failure of one of the server host nodes in the cluster.

In the illustrated example, a CLI and APIs are used to manage the ToR switches 110, 112, 116, 118. For example, the HMS 108, 114 uses CLI/APIs to populate switch objects corresponding to the ToR switches 110, 112, 116, 118. On HMS bootup, the HMS 108, 114 populates initial switch objects with statically available information. In addition, the HMS 108, 114 uses a periodic polling mechanism as part of an HMS switch management application thread to collect statistical and health data from the ToR switches 110, 112, 116, 118 (e.g., Link states, Packet Stats, Availability, etc.). There is also a configuration buffer as part of the switch object which stores the configuration information to be applied on the switch.

The HMS 108, 114 of the illustrated example of FIG. 1 is a stateless software agent responsible for managing individual hardware resources in a physical rack 102, 104. Examples of hardware elements that the HMS 108, 114 manages are servers and network switches in the physical rack 102, 104. In the illustrated example, the HMS 108, 114 is implemented using Java on Linux so that an OOB management portion of the HMS 108, 114 runs as a Java application on a white box management switch (e.g., the management switch 107, 113, etc.) in the physical rack 102, 104. However, any other programming language and any other OS may be used to implement the HMS 108, 114.

In the illustrated example of FIG. 1, the SDDC manager 125, 127 allocates server host nodes (0-2) 109 of the first physical rack 102 and server host nodes (0-2) 111 of the second physical rack 104 to a first workload domain 129. The first workload domain 129 of the illustrated example can execute a computing task specified by a user such as executing an application, processing data, performing a calculation, etc. Further shown in the illustrated example, the SDDC manager 125, 127 allocates the server host nodes (4-7) 109 of the first physical rack 102 to a second workload domain 131. Further shown in the illustrated example, the SDDC manager 125, 127 allocates the server host nodes (9-11) 109 of the first physical rack 102 and the server host nodes (9-11) 111 of the second physical rack 104 to a third workload domain 133. Additionally or alternatively, the example SDDC manager 125, 127 may allocate one or more of the server host nodes (0-11) 109 of the first physical rack to two or more of the workload domains 129, 131, 133.

In the illustrated example of FIG. 1, the SDDC manager 127 of the second physical rack 104 is communicatively coupled to external storage resources 135 via a network 137. Additionally or alternatively, the example SDDC manager 125 of the first physical rack 102 may be communicatively coupled to the external storage resources 135 via the network 137. In the illustrated example of FIG. 1, the external storage resources 135 is a network attached storage (NAS) unit. For example, the external storage resources 135 may include one or more controllers (e.g., specialized servers), one or more interconnect modules, and/or a plurality of storage trays with storage disks. In some examples, the SDDC manager 125, 127 can allocate an external storage resource included in the external storage resources 135 to the first workload domain 129, the second workload domain 131, the third workload domain 133, etc., and/or a combination thereof.

In the illustrated example of FIG. 1, the network 137 is the Internet. However, the example network 137 may be implemented using any suitable wired and/or wireless network(s) including, for example, one or more data buses, one or more Local Area Networks (LANs), one or more wireless LANs, one or more cellular networks, one or more private networks, one or more public networks, etc. The example network 137 enables the SDDC manager 127 of the second physical rack 104 to be in communication with the external storage resources 135. As used herein, the phrase "in communication," including variances therefore, encompasses direct communication and/or indirect communication through one or more intermediary components and does not require direct physical (e.g., wired) communication and/or constant communication, but rather includes selective communication at periodic or aperiodic intervals, as well as one-time events. Alternatively, the phrase "in communication," including variances therefore, may encompass direct physical communication and/or constant communication.

Figure 2:
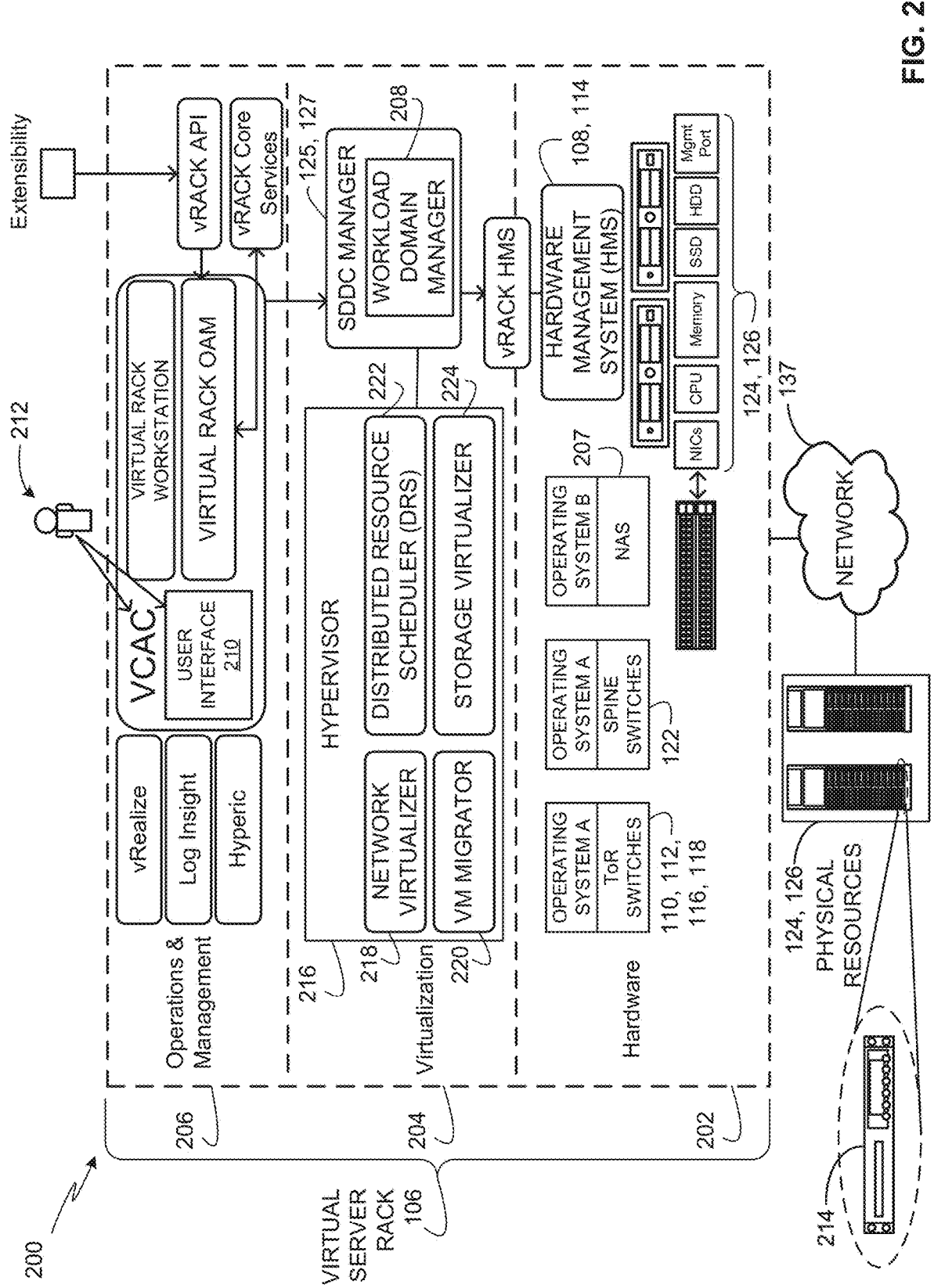
FIG. 2 illustrates an example architecture to configure and deploy the example virtual rack of FIG. 1.

FIG. 2 depicts an example virtual server rack architecture 200 that may be used to configure and deploy the virtual server rack 106 of FIG. 1. The example architecture 200 of FIG. 2 includes a hardware layer 202, a virtualization layer 204, and an operations and management (OAM) layer 206. In the illustrated example, the hardware layer 202, the virtualization layer 204, and the OAM layer 206 are part of the example virtual server rack 106 of FIG. 1. The virtual server rack 106 of the illustrated example is based on the physical racks 102, 104 of FIG. 1. The example virtual server rack 106 configures the physical hardware resources 124, 126, virtualizes the physical hardware resources 124, 126 into virtual resources, provisions virtual resources for use in providing cloud-based services, and maintains the physical hardware resources 124, 126 and the virtual resources.

The example hardware layer 202 of FIG. 2 includes the HMS 108, 114 of FIG. 1 that interfaces with the physical hardware resources 124, 126 (e.g., processors, NICs, servers, switches, storage devices, peripherals, power supplies, etc.), the ToR switches 110, 112, 116, 118 of FIG. 1, the spine switches 122 of FIG. 1, and network attached storage (NAS) hardware 207. The HMS 108, 114 is configured to manage individual hardware nodes such as different ones of the physical hardware resources 124, 126. For example, managing of the hardware nodes involves discovering nodes, bootstrapping nodes, resetting nodes, processing hardware events (e.g., alarms, sensor data threshold triggers, etc.) and state changes, exposing hardware events and state changes to other resources and a stack of the virtual server rack 106 in a hardware-independent manner. The HMS 108, 114 also supports rack-level boot-up sequencing of the physical hardware resources 124, 126 and provides services such as secure resets, remote resets, and/or hard resets of the physical hardware resources 124, 126.

The HMS 108, 114 of the illustrated example is part of a dedicated management infrastructure in a corresponding physical rack 102, 104 including the dual-redundant management switches 107, 113 and dedicated management ports attached to the server host nodes (0) 109, 111 and the ToR switches 110, 112, 116, 118. In the illustrated example, one instance of the HMS 108, 114 runs per physical rack 102, 104. For example, the HMS 108, 114 can run on the management switch 107, 113 and the server host node (0) 109, 111 installed in the example physical rack 102 of FIG. 1. In the illustrated example of FIG. 1 both HMSs 108, 114 are provided in corresponding management switches 107, 113 and the corresponding server host nodes (0) 109, 111 as a redundancy feature in which one of the HMSs 108, 114 is a primary HMS, while the other one of the HMSs 108, 114 is a secondary HMS. In this manner, one of the HMSs 108, 114 can take over as a primary HMS in the event of a failure of a management switch 107, 113 and/or a failure of the server host nodes (0) 109, 111 on which the other HMS 108, 114 executes.

In some examples, to help achieve or facilitate seamless failover, two instances of an HMS 108, 114 run in a single physical rack 102, 104. In such examples, the physical rack 102, 104 is provided with two management switches, and each of the two management switches runs a separate instance of the HMS 108, 114. In such examples, the physical rack 102 of FIG. 1 runs two instances of the HMS 108 on two separate physical hardware management switches and two separate server host nodes (0), and the physical rack 104 of FIG. 1 runs two instances of the HMS 114 on two separate physical hardware management switches and two separate server host nodes (0). For example, one of the instances of the HMS 108 on the physical rack 102 serves as the primary HMS 108 and the other instance of the HMS 108 serves as the secondary HMS 108. The two instances of the HMS 108 on two separate management switches and two separate server host nodes (0) in the physical rack 102 (or the two instances of the HMS 114 on two separate management switches and two separate server host nodes (0) in the physical rack 104) are connected over a point-to-point, dedicated Ethernet link which carries heartbeats and memory state synchronization between the primary and secondary HMS instances.

The example virtualization layer 204 of the illustrated example includes the SDDC manager 125, 127. The example SDDC manager 125, 127 communicates with the HMS 108, 114 to manage the physical hardware resources 124, 126. The example SDDC manager 125, 127 creates the example virtual server rack 106 out of underlying physical hardware resources 124, 126 that may span one or more physical racks (or smaller units such as a hyper-appliance or half rack) and handles physical management of those resources. The example SDDC manager 125, 127 uses the virtual server rack 106 as a basis of aggregation to create and provide operational views, handle fault domains, and scale to accommodate workload profiles. The example SDDC manager 125, 127 keeps track of available capacity in the virtual server rack 106, maintains a view of a logical pool of virtual resources throughout the SDDC life-cycle, and translates logical resource provisioning to allocation of physical hardware resources 124, 126.

In the illustrated example of FIG. 2, the SDDC manager 125, 127 includes a workload domain manager 208 to allocate resources associated with a hybrid data object and/or a hybrid workload domain. In some examples, the workload domain manager 208 is communicatively coupled to a user interface 210 in the OAM layer 206. The user interface 210 of the illustrated example receives inputs from and/or displays information to an example administrator 212 (e.g., a user or data center operator). For example, the administrator 212 may input information regarding an application that is to be run using the resources associated with a hybrid workload domain. In some examples, the information regarding the application includes virtual resources (e.g., virtual servers) and bare metal resources (e.g., bare metal servers). For example, the workload domain manager 208 may access virtual resources to determine whether the virtual resources are available for the hybrid workload domain. In some such examples, the workload domain manager 208 directs the HMS 108, 114 to compose virtual servers or portions of the virtual servers to be used to run an application or a portion of an application. The virtual servers or portion of the virtual servers available to the example workload domain manager 208 are then added to a virtual server pool. In some examples, the virtual server pool includes all of the virtual servers that are available to the administrator 212.

When the workload domain manager 208 determines the virtual servers that are to be included in the virtual server pool, the workload domain manager 208 obtains inventory and resource data regarding the virtual servers. For examples, the workload domain manager 208 obtains information regarding the compute resources available at the virtual server, the storage available at the virtual server, and the capacity (e.g., number of resources) of the virtual server. Additionally or alternatively, the workload domain manager 208 obtains information regarding the compute resource, the memory, and/or the storage used for other tasks or applications, a physical position of the hardware associated with the virtual server (e.g., in a server rack), and/or a server chip and/or motherboard associated with the virtual server.

In some examples, the workload domain manager 208 acquires bare metal resources by contacting the physical resources 124, 126 via the example network 137. In some examples, the network 137 is an out-of-band network that connects the workload domain manager 208 to the physical resources 124, 126. For example, the workload domain manager 208 may monitor and communicate with the physical resources 124, 126 using an intelligent platform management interface (IPMI). In such examples, a baseboard management controller may be a component of the IPMI included in a microcontroller each of the bare metal servers of the physical resources 124, 126. In some examples, the network 137 connecting the workload domain manager 208 to the physical resources 124, 126 may be a separate network from the network connecting other components of the hardware layer 202. In some examples, the network 137 is not connected to the internet and is connected only to the physical resources 124, 126.

In some examples, the workload domain manager 208 transmits a message to one or more bare metal servers to determine whether the one or more bare metal servers of the physical resources 124, 126 are available for the workload domain manager 208 to use in running an application or a portion of the application. For example, the workload domain manager 208 may transmit a message to a microcontroller associated with a bare metal server 214. In some examples, each of the bare metal servers of the physical resources 124, 126 includes a microcontroller capable of receiving and responding to a message transmitted from the workload domain manager 208 over the network 137. For example, the microcontroller of the bare metal server 214 may respond to a message from the workload domain manager 208 indicating that the bare metal server 214 is available to be included in the hybrid workload domain. Alternatively, the microcontroller may respond to indicate that the workload domain manager 208 cannot allocate the bare metal server 214 to be included in the hybrid workload domain. For example, the microcontroller may indicate that the bare metal server 214 is currently in use to run another application or another portion of an application. In some such examples, the other application is managed by another administrator (e.g., not the administrator 212). Alternatively, the other application may be managed by the same administrator as the application for which the workload domain manager 208 is querying the physical resources 124, 126 (e.g., the administrator 212).

In some examples, the workload domain manager 208 may force acquire the bare metal server 214 after the microcontroller has responded indicating that the bare metal server 214 is unavailable. In some such examples, the workload domain manager 208 may forcibly acquire the bare metal server 214 from a previous administrator so that the bare metal server 214 may be available for use in the hybrid workload domain. For example, when the bare metal server 214 is unavailable because the bare metal server 214 is allocated for a different application, the administrator 212 may override control of the bare metal server 214 if the administrator 212 has authority to do so. In such an example, the workload domain manager 208 allocates the bare metal server 214 to a bare metal server pool (e.g., a collection of all available bare metal servers).

When the workload domain manager 208 receives a response from the one or more bare metal servers that the workload domain manager 208 can acquire the bare metal servers for the workload domain, the workload domain manager 208 adds the one or more bare metal servers to the bare metal server pool. Further, the workload domain manager 208 obtains information about the bare metal servers, including, for example, the compute resources available at the bare metal server(s), the storage available at the bare metal server(s), and the capacity (e.g., number of resources) of the bare metal server(s). Additionally or alternatively, the workload domain manager 208 obtains information regarding the compute resources, the memory, and/or the storage used for a task or an application on each of the bare metal servers, a physical position of the bare metal servers (e.g., in a server rack), and/or server chips and/or motherboards associated with the bare metal servers.

In some examples, the workload domain manager 208 combines the allocated bare metal servers of the physical resources 124, 126 with the allocated virtual servers into the hybrid server pool. In some examples, the hybrid server pool is made available to the administrator 212 through the user interface 210. For example, the user interface 210 in the OAM layer 206 displays the hybrid data object to the administrator 212. An example implementation of the user interface 210 is illustrated in connection with FIG. 4. In some examples, the administrator 212 inputs selections into the user interface 210 to determine a hybrid workload domain. For example, the administrator 212 may select the virtual servers and bare metal servers from the hybrid server pool displayed in the user interface 210 that are to be included in the hybrid workload domain.

In some examples, the administrator 212 determines an application that is to operate on the hybrid workload domain. In such examples, the administrator 212 further determines the requirements of the application, such as an amount of compute resource, storage, memory, etc., used to run the application. In some such examples, the administrator 212 further determines the amount of compute resource, storage, memory, etc., used in connection with a portion of the application. For example, the administrator 212 may determine that a portion of the application uses a constant, high level of compute resources, and the administrator 212 may accordingly determine that the bare metal server 214 is to be used to facilitate operation of that portion of the application. In some alternative examples, the administrator 212 may determine that a portion of the application prioritizes scalability and flexibility, and the administrator 212 may determine that one or more virtual servers are to be used for that portion of the application. In some examples, the administrator 212 inputs selections based on the application into the user interface 210 to determine the resources that are to be included in the hybrid workload domain.

In the illustrated example of FIG. 2, the SDDC manager 125, 127 interfaces with an example hypervisor 216 of the virtualization layer 204 (e.g., via the example user interface 210). The example hypervisor 216 is installed and runs on server hosts in the example physical hardware resources 124, 126 to enable the server hosts to be partitioned into multiple logical servers to create VMs. In some examples, the hypervisor 216 may be implemented using a VMWARE ESXI™ hypervisor available as a component of a VMWARE VSPHERE® virtualization suite developed and provided by VMware, Inc. The VMWARE VSPHERE® virtualization suite is a collection of components to setup and manage a virtual infrastructure of servers, networks, and other resources.

In the illustrated example of FIG. 2, the hypervisor 216 is shown having a number of virtualization components executing thereon including an example network virtualizer 218, an example VM migrator 220, an example distributed resource scheduler (DRS) 222, and an example storage virtualizer 224. In the illustrated example, the SDDC manager 125, 127 communicates with these components to manage and present the logical view of underlying resources such as hosts and clusters. The example SDDC manager 125, 127 also uses the logical view for orchestration and provisioning of workloads.

The example network virtualizer 218 abstracts or virtualizes network resources such as physical hardware switches (e.g., the management switches 107, 113 of FIG. 1, the ToR switches 110, 112, 116, 118, and/or the spine switches 122, etc.) to provide software-based virtual or virtualized networks. The example network virtualizer 218 enables treating physical network resources (e.g., routers, switches, etc.) as a pool of transport capacity. In some examples, the network virtualizer 218 also provides network and security services to VMs with a policy driven approach. The example network virtualizer 218 includes a number of components to deploy and manage virtualized network resources across servers, switches, and clients. For example, the network virtualizer 218 includes a network virtualization manager that functions as a centralized management component of the network virtualizer 218 and runs as a virtual appliance on a server host.

In some examples, the network virtualizer 218 can be implemented using a VMWARE NSX™ network virtualization platform that includes a number of components including a VMWARE NSX™ network virtualization manager. For example, the network virtualizer 218 can include a VMware® NSX Manager™. The NSX Manager can be the centralized network management component of NSX, and is installed as a virtual appliance on any ESX™ host (e.g., the hypervisor 216, etc.) in a vCenter Server environment to provide an aggregated system view for a user. For example, an NSX Manager can map to a single vCenter Server environment and one or more NSX Edge, vShield Endpoint, and NSX Data Security instances. For example, the network virtualizer 218 can generate virtualized network resources such as a logical distributed router (LDR) and/or an edge services gateway (ESG).

The example VM migrator 220 is provided to move or migrate VMs between different hosts without losing state during such migrations. For example, the VM migrator 220 allows moving an entire running VM from one physical server to another with substantially little or no downtime. The migrating VM retains its network identity and connections, which results in a substantially seamless migration process. The example VM migrator 220 enables transferring the VM's active memory and precise execution state over a high-speed network, which allows the VM to switch from running on a source server host to running on a destination server host.

The example DRS 222 is provided to monitor resource utilization across resource pools, to manage resource allocations to different VMs, to deploy additional storage capacity to VM clusters with substantially little or no service disruptions, and to work with the VM migrator 220 to automatically migrate VMs during maintenance with substantially little or no service disruptions.

The example storage virtualizer 224 is software-defined storage for use in connection with virtualized environments. The example storage virtualizer 224 clusters server-attached hard disk drives (HDDs) and solid-state drives (SSDs) to create a shared datastore for use as virtual storage resources in virtual environments. In some examples, the storage virtualizer 224 may be implemented using a VMWARE VIRTUAL SAN™ network data storage virtualization component developed and provided by VMware, Inc.

The virtualization layer 204 of the illustrated example, and its associated components are configured to run VMs. However, in other examples, the virtualization layer 204 may additionally and/or alternatively be configured to run containers. For example, the virtualization layer 204 may be used to deploy a VM as a data computer node with its own guest OS on a host using resources of the host. Additionally and/or alternatively, the virtualization layer 204 may be used to deploy a container as a data computer node that runs on top of a host OS without the need for a hypervisor or separate OS.

In the illustrated example, the OAM layer 206 is an extension of a VMWARE VCLOUD® AUTOMATION CENTER™ (VCAC) that relies on the VCAC functionality and also leverages utilities such as VMWARE VCENTER™ LOG INSIGHT™, and VMWARE VCENTER™ HYPERIC® to deliver a single point of SDDC operations and management. The example OAM layer 206 is configured to provide different services such as health monitoring service, capacity planner service, maintenance planner service, events and operational view service, and virtual rack application workloads manager service.

Example components of FIG. 2 may be implemented using products developed and provided by VMware, Inc. Alternatively, some or all of such components may alternatively be supplied by components with the same and/or similar features developed and/or provided by other virtualization component developers.

Figure 3:
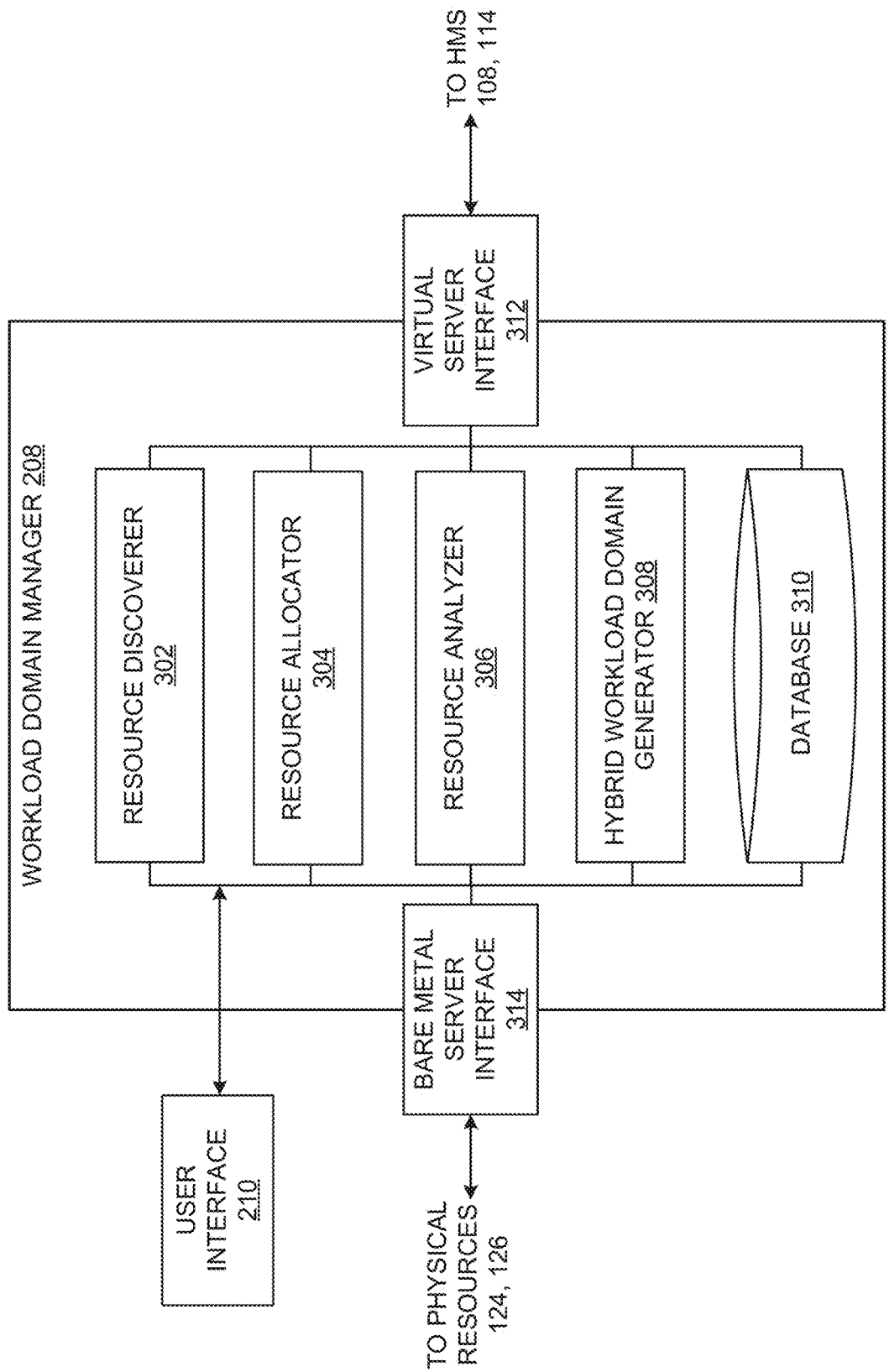
FIG. 3 is a block diagram of the example workload domain manager of FIG. 2 implemented to manage workload domains in accordance with examples disclosed herein.

FIG. 3 is a block diagram of the example workload domain manager 208 of FIG. 2 implemented to manage workload domains in accordance with examples disclosed herein. The workload domain manager 208 includes an example resource discoverer 302, an example resource allocator 304, an example resource analyzer 306, an example hybrid workload domain generator 308, an example database 310, an example virtual server interface 312, and an example bare metal server interface 314. The workload domain manager 208 of the illustrated example determines the availability of resources (e.g., from virtual servers and bare metal servers) for use in the generation of a hybrid workload domain and allocates such resources to the workload domain. For example, the workload domain manager 208 may allocate virtual servers (e.g., via the example HMS 108, 114 of FIGS. 1 and/or 2) and bare metal servers (e.g., from the example physical resources 124, 126 of FIGS. 1 and/or 2) to be used by a hybrid workload domain to run an application.

The workload domain manager 208 of the illustrated example is communicatively coupled to the example user interface 210 of FIG. 2. For example, the workload domain manager may receive inputs from a user (e.g., the administrator 212 of FIG. 2) via the user interface 210. In some examples, the workload domain manager 208 determines resources (e.g., virtual servers and/or bare metal servers) to be displayed to the administrator 212 on the user interface 210. In the illustrated example, the workload domain manager 208 is further in communication with the HMS 108, 114, which allows the workload domain manager 208 to access and/or allocate the virtual servers. Additionally, the workload domain manager 208 of the illustrated example is communicatively coupled to the physical resources 124, 126, which allows the workload domain manager 208 to access bare metal servers (e.g., the bare metal server 214 of FIG. 2).

In operation, the example resource discoverer 302 of the example workload domain manager 208 discovers available virtual servers and/or available bare metal servers. For example, the resource discoverer 302 may query the physical resources 124, 126 via the bare metal server interface 314 to determine the availability of bare metal servers included in the physical resources 124, 126. In some such examples, the resource discoverer 302 initially determines a total number of bare metal servers that are included in the physical resources 124, 126 (e.g., a number of bare metal servers on a server rack).

In some examples, the resource discoverer 302 queries the HMS 108, 114 via the virtual server interface 312 to determine the virtual servers that are available. For example, the resource discoverer 302 may request information from the HMS 108, 114 regarding the available virtual servers in the virtual server rack 106. In such examples, the HMS 108, 114 returns information to the resource discoverer 302 regarding the virtual servers that can be accessed and/or obtained by the workload domain manager 208 and added to the virtual server pool discussed in connection with FIG. 2.

The resource discoverer 302 of the illustrated example further queries bare metal servers of the physical resources 124, 126. For example, the resource discoverer 302 may transmit a message to the bare metal server 214 via the bare metal server interface 314 to determine whether the bare metal server 214 is currently in use by another administrator (e.g., not the administrator 212) and/or in use for another application. In some examples, the bare metal server 214 and the other bare metal servers in the physical resources 124, 126 include microcontrollers capable of responding to messages transmitted from the resource discoverer 302. For example, the microcontroller operating on the bare metal server 214 may have an operating system that facilitates communication between the bare metal server 214 and the resource discoverer 302.

In some examples, when the bare metal server 214 is in use to run an alternative application or is already included in a different workload domain, the microcontroller of the bare metal server 214 may transmit a return message to the resource discoverer 302 to notify the resource discoverer 302 that the bare metal server 214 cannot be brought under control of the workload domain manager 208. Alternatively, the microcontroller may transmit a message to the resource discoverer 302 notifying the resource discoverer 302 that the bare metal server 214 is available for use by the workload domain manager 208. In such examples, the bare metal server 214 is added to a bare metal server pool (e.g., a collection of available bare metal servers).

In some examples, the resource discoverer 302 stores the information regarding the availability of the virtual servers and the bare metal servers in the database 310. The resource allocator 304 of the illustrated example may access the information stored in the database 310. Additionally or alternatively, the resource allocator 304 may be communicatively coupled to the resource discoverer 302 and may access the information regarding the available bare metal and virtual servers.

The resource allocator 304 of the illustrated example determines the virtual servers and the bare metal servers that are to be added to a hybrid server pool. As used herein, the hybrid server pool is a combination of the virtual server pool and the bare metal server pool. In some examples, the resource allocator 304 allocates all of the available virtual servers (e.g., in the virtual server pool) and all of the available bare metal servers (e.g., in the bare metal server pool) determined by the resource discoverer 302. Additionally or alternatively, the resource allocator 304 may determine that all of the bare metal servers are to be added to the hybrid server pool, while only a portion of the virtual servers are to be added to the hybrid server pool. In some alternative examples, the resource allocator 304 determines that all of the available virtual servers are to be used, while not all of the available bare metal servers are to be added to the hybrid server pool. Further, the resource allocator 304 of the illustrated example may determine that a portion of the available virtual servers and a portion of the available bare metal servers are to be added to the hybrid server pool.

In some examples, the resource allocator 304 determines the servers to be added to the hybrid server pool based on an application that is to be operated using the virtual resources and the bare metal resources. For example, the application may have specified parameters that indicate an amount of bare metal resource and an amount of virtual resource that is to be used to run the application. In some such examples, the resource allocator 304 determines the bare metal servers and virtual servers to be added to the hybrid server pool based on the parameters of the application. In some examples, the administrator 212 inputs the parameters of the application into the user interface 210, and the resource allocator 304 allocates the servers to the hybrid server pool based on the input of the administrator 212.

In the illustrated example, the resource allocator 304 further brings the servers (e.g., virtual servers and bare metal servers) to be added to the hybrid server pool under management of the workload domain manager 208. For example, the resource allocator 304 communicates with the example HMS 108, 114 to allocate the virtual servers for the workload domain manager 208. In some examples, the HMS 108, 114 allocates a portion of the virtual server rack 106 for the workload domain manager 208 based on a communication from the resource allocator 304 (e.g., via the virtual server interface 312).

The resource allocator 304 further allocates the bare metal servers determined to be added to the hybrid data object. For example, when the resource discoverer 302 has determined that a bare metal server (e.g., the bare metal server 214) is available, the resource allocator 304 may bring the bare metal server 214 under control of the workload domain manager 208 using an application program interface (API) (e.g., Redfish API). In some examples, the resource allocator 304 interfaces with the microcontroller of the bare metal server 214 to bring the bare metal server 214 under control of the workload domain manager 208. For example, the API may enable the resource allocator 304 to create a management account on the bare metal server microcontroller that allows control of the bare metal server 214.

In some examples, the resource allocator 304 determines that the bare metal server 214 is to be allocated for the hybrid server pool although the resource discoverer 302 determined that the bare metal server 214 is unavailable (e.g., the bare metal server 214 is to be force acquired). For example, the resource allocator 304 may bring the bare metal server 214 under control of the workload domain manager 208 when the bare metal server 214 is currently being used for another application. In such examples, the resource allocator 304 may have authority to bring the bare metal server 214 under control of the workload domain manager 208. Additionally or alternatively, the resource allocator 304 may determine that the bare metal server 214 is in use by an application that the administrator 212 manages, and, thus, the resource allocator 304 determines that the administrator 212 has given permission to allocate the bare metal server 214 to the workload domain manager 208. In some such examples, the workload domain manager 208 may transmit a message to the be displayed via the user interface 210 requesting permission from the administrator to force acquire the bare metal server 214. In response to the message, the administrator 212 may instruct the resource allocator 304 to acquire the bare metal server 214 regardless of whether the bare metal server 214 is currently in use for a different application.

In some examples, the workload domain manager 208 further configures the bare metal servers. For example, the resource allocator 304 may configure a network time protocol (NTP) to sync a clock of the bare metal servers with a clock of the machine on which the workload domain manager 208 is operating. Additionally or alternatively, the resource allocator 304 may configure the NTP to sync the clock of each respective bare metal server (e.g., the bare metal server 214) in the bare metal server pool. In some examples, the resource allocator 304 may configure a single sign-on (SSO) to allow the administrator 212 to log in to the software running on the bare metal server 214 when using the software operating the workload domain manager 208.

In the illustrated example, the resource analyzer 306 determines information regarding the resources allocated by the resource allocator 304. For example, the resource analyzer 306 transmits a message to the HMS 108, 114 via the virtual server interface 312 to determine information regarding the virtual servers. In some examples, the HMS 108, 114 transmits information back to the resource analyzer 306 including information about an amount of compute resource, storage, memory, etc., available on the virtual servers. For example, the resource analyzer 306 may receive information from one virtual server (e.g., from a total of four virtual servers included in the virtual server pool) detailing an amount of memory (e.g., 100 GB), processing capabilities (e.g., a twelve core processor), and/or storage capacity (e.g., 500 GB, 1 TB, 2 TB, etc.). In some examples, the resource analyzer 306 requests this information from each virtual server available in the virtual server pool. Additionally or alternatively, the resource analyzer 306 obtains information regarding the compute resources, the memory, and/or the storage used for other tasks or applications), a physical position of the hardware (e.g., in a server rack) associated with the virtual server, and/or a server chip and/or motherboard included in a physical server associated with the virtual server.

The resource analyzer 306 of the illustrated example further communicates with the bare metal servers through the bare metal sever interface 314. In some examples, the microcontroller of one of the bare metal servers (e.g., the bare metal server 214) transmits information to the resource analyzer 306 including information regarding compute resource, storage, memory, etc., available at the bare metal server 214. For example, the resource analyzer 306 may receive information from the bare metal server 214 including an amount of memory (e.g., 100 GB), a processor (e.g., a twelve core processor), and/or an amount of storage (e.g., 10 TB, 12 TB, etc.). Additionally or alternatively, the resource analyzer 306 may request information including compute resource, memory, and/or the storage used for other tasks or applications, a physical position of the bare metal server 214 (e.g., in a server rack), and/or a server chip and/or motherboard associated with the bare metal server 214.

In some examples, the resource analyzer 306 stores the information regarding the virtual servers and the bare metal servers in the database 310. For example, the resource analyzer 306 may store a name associated with a server (e.g., a virtual server or a bare metal server) and the information obtained by the resource analyzer 306 for the server in the database 310. The information stored in the example database 310 may be accessed by the example resource allocator 304 to combine the virtual resources (e.g., the collection of virtual servers) and the bare metal resources (e.g., the collection of bare metal servers) into the hybrid server pool. For example, the hybrid server pool may be a collection of the virtual servers and the bare metal servers stored in the database 310.

The hybrid workload domain generator 308 of the illustrated example generates a hybrid workload domain based on the resources (e.g., the combined virtual and bare metal servers) included in the hybrid server pool. For example, the hybrid workload domain generator 308 may access the hybrid server pool stored in the database 310. In some examples, the hybrid workload domain generator 308 transmits the hybrid server pool to the user interface 210 to be displayed to the administrator 212. An example implementation of the user interface 210 is illustrated in connection with FIG. 4. The administrator 212 may provide input into the example user interface 210 to determine which servers included in the hybrid server pool are to be included in the hybrid workload domain. For example, the administrator 212 may select specific virtual servers and bare metal servers from a list of the servers included in the hybrid server pool.

In some examples, the selections of the administrator 212 are then used by the hybrid workload domain generator 308 to determine the servers that are to be used to run an application. For example, the administrator 212 may determine that particular bare metal servers are to be used for the application because of the amount of demand of the application for compute resources, while the administrator 212 may select particular virtual servers for functions of the application that prioritize scalability and flexibility. When the administrator 212 selects such virtual servers and bare metal servers, the hybrid workload domain generator 308 generates the hybrid workload domain to run the application.

While an example manner of implementing the workload domain manager 208 of FIG. 2 is illustrated in FIG. 3, one or more of the elements, processes and/or devices illustrated in FIG. 3 may be combined, divided, re-arranged, omitted, eliminated and/or implemented in any other way. Further, the example resource discoverer 302, the example resource allocator 304, the example resource analyzer 306, the example hybrid workload domain generator 308, the example database 310, the example virtual server interface 312, the example bare metal server interface 314, and/or, more generally, the example workload domain manager 208 of FIG. 3 may be implemented by hardware, software, firmware and/or any combination of hardware, software and/or firmware. Thus, for example, any of the example resource discoverer 302, the example resource allocator 304, the example resource analyzer 306, the example hybrid workload domain generator 308, the example database 310, the example virtual server interface 312, the example bare metal server interface 314, and/or, more generally, the example workload domain manager 208 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example resource discoverer 302, the example resource allocator 304, the example resource analyzer 306, the example hybrid workload domain generator 308, the example database 310, the example virtual server interface 312, the example bare metal server interface 314, and/or the example workload domain manager 208 is/are hereby expressly defined to include a non-transitory computer readable storage device or storage disk such as a memory, a digital versatile disk (DVD), a compact disk (CD), a Blu-ray disk, etc. including the software and/or firmware. Further still, the example workload domain manager 208 of FIG. 2 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
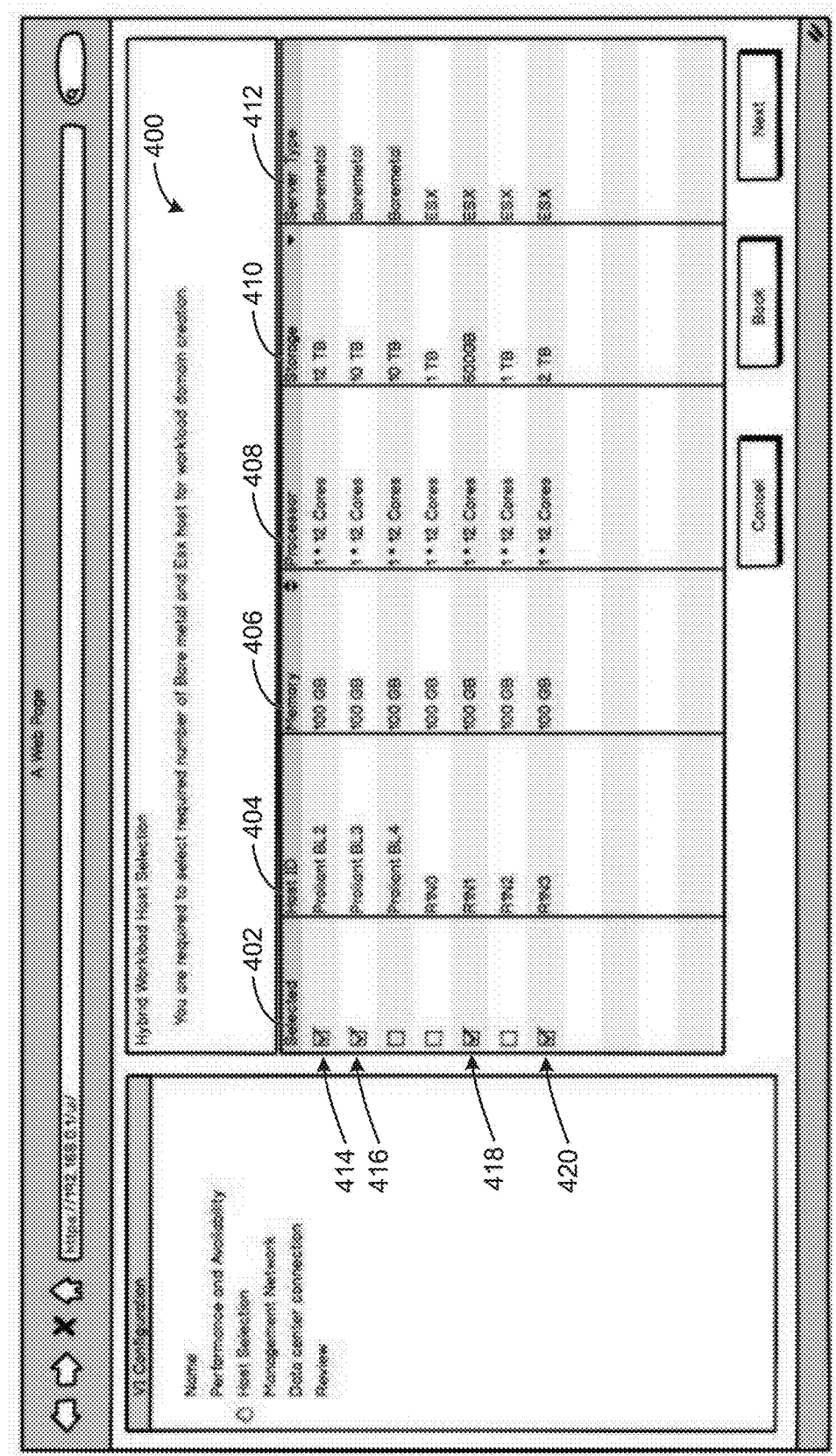
FIG. 4 is an illustration of the example user interface of FIG. 2 used to assign virtual servers and/or bare metal servers to a workload domain.

FIG. 4 is an illustration of the example user interface 210 of FIG. 2 used to assign virtual servers and/or bare metal servers to a workload domain. The user interface 210 of the illustrated example includes columns 400 detailing information about the hybrid server pool (e.g., discussed in connection with FIGS. 2 and 3) and allows an administrator (e.g., the administrator 212 of FIG. 2) to select servers (e.g., virtual servers and/or bare metal servers) included in the hybrid data object. In some examples, the columns 400 includes information obtained by the example resource analyzer 306 of FIG. 3. The columns 400 include an example selection column 402, an example host identifier (ID) column 404, an example memory column 406, an example processor column 408, an example storage column 410, and an example server type column 412.

The example selection column 402 allows the administrator 212 to select the servers from the server pool that the administrator 212 prefers to be included in the hybrid workload domain. In the illustrated example, a first row 414, a second row 416, a fifth row 418, and a seventh row 420 have been selected (e.g., by the administrator 212). The selections in the illustrated example of FIG. 4 show that the resources available from the servers of the first row 414, the second row 416, the fifth row 418, and the seventh row 420 are to be used to generate the workload domain that is to run the application.

The example host ID column 404 indicates an identifier (e.g., a name) of the host server. The example memory column 406 indicates an amount memory available at the server associated with the host ID. For example, the servers of the first row 414 (e.g., associated with the host ID Proliant BL2), the second row 416 (e.g., associated with the host ID Proliant BL3), the fifth row 418 (e.g., associated with the host ID R1N1), and the seventh row 420 (e.g., associated with the host ID R1N3) each have 100 GB of memory. In alternative examples, the servers may have more or less memory. The example processor column 408 indicates a processor associated with the server. For example, the first row 414, the second row 416, the fifth row 418, and the seventh row 420 each have a 12 core processor (e.g., indicated as 1*12 Cores in the processor column 408). In some alternative examples, the processor indicated in processor column 408 may be a different type of processor (e.g., a 10 core processor, a quad core processor, etc.).

The example storage column 410 indicates an amount of storage associated with the server. For example, the server associated with the first row 414 has 12 TB of storage, while the server associated with the fifth row 418 has 500 GB of storage. The example server type column 412 indicates whether the server included in a row (e.g., the first row 414) is a virtual server or a bare metal server. For example, the server associated with the first row 414 is a bare metal server, while the server associated with the fifth row 418 is a virtual server (e.g., labeled ESX in FIG. 4).

The user interface 210 of the illustrated example of FIG. 4 displays the information included in the columns 400 to enable the administrator 212 to determine the servers that are to be included in the hybrid workload domain. For example, the administrator 212 may compare bare metal servers to one another or compare virtual servers to one another. Further, the administrator 212 may compare virtual servers to bare metal servers, while determining what resources the application demands. For example, the administrator 212 may compare the server associated with the first row 414 with the server associated with the second row 416. The servers of the first row 414 and the second row 416 are both bare metal servers, as indicated by the server type column 412. Further, the memory column 406 and the processor column 408 indicate that the servers associated with the first row 414 and the second row 416 have the same amount of memory (e.g., 100 GB) and the same processor (e.g., twelve core processors), but have a different amount of storage. For example, the storage column 410 illustrates that the server associated with the first row 414 has 12 TB of storage, while the server associated with the second row 416 has 10 TB of storage. Thus, the administrator 212 is able to differentiate between the servers and determine what resources most closely align with the demands of the application.

The user interface 210 further facilitates a comparison between the virtual servers, such as the servers associated with the fifth row 418 and the seventh row 420. For example, the servers associated with the fifth row 418 and the seventh row 420 have the same amount of memory (e.g., 100 GB) and the same processor (e.g., twelve core processors), which is also the same as the memory and processor associated with the bare metal servers associated with the first row 414 and the second row 416. The servers associated with the fifth row 418 and the seventh row 420 are differentiated based on the storage capacity (e.g., shown in the storage column 410). For example, the server associated with the fifth row 418 has 500 GB of storage, while the server associated with the seventh row 420 has 2 TB of storage. In the illustrated example, the fifth row 418 and the seventh row 420 were selected by the administrator 212. The illustrated example further displays the differences between the storage of the bare metal servers (e.g., 12 TB of storage for the server associated with the first row 414) and the storage of the virtual servers (e.g., 500 GB of storage for the server associated with the fifth row 418).

Figure 5A:
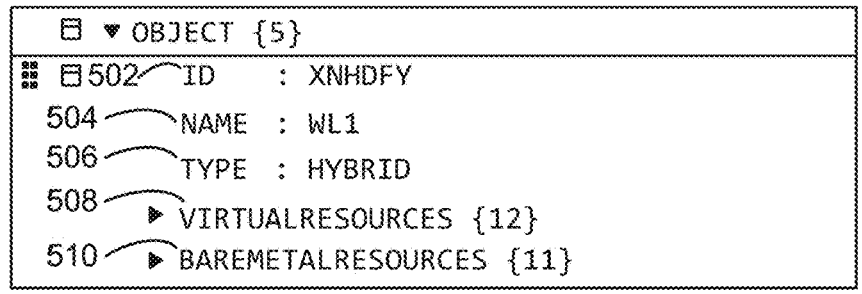
FIGS. 5A and 5B are example illustrations of a JavaScript Object Notation (JSON) structure for a hybrid workload domain.
Figure 5B:
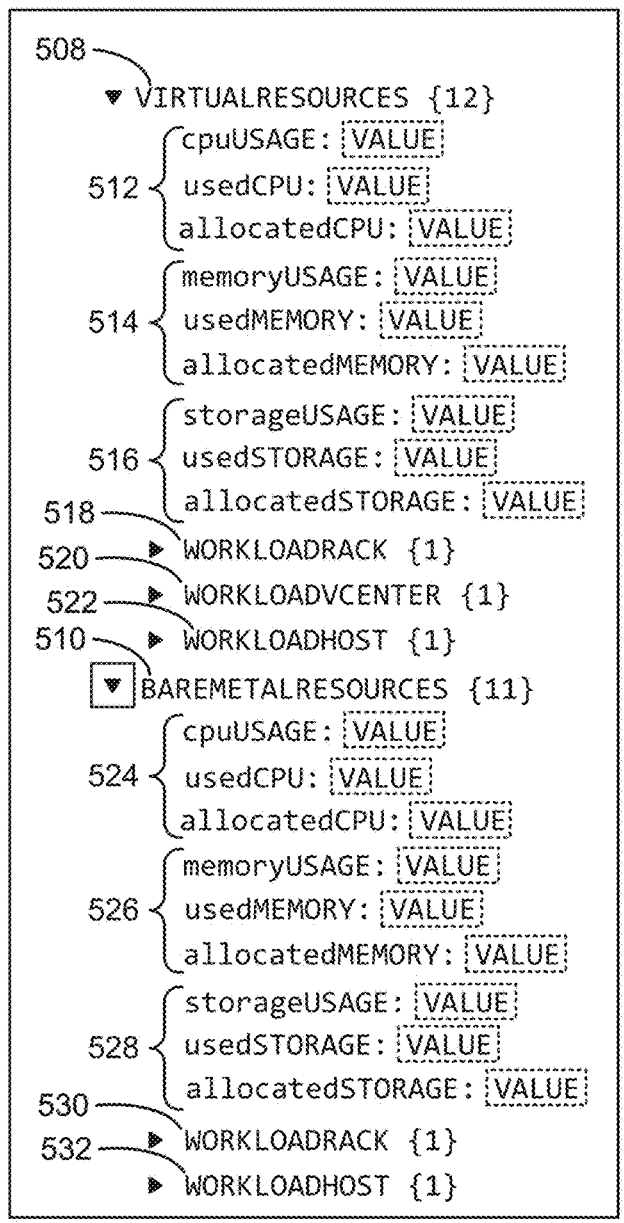

FIGS. 5A and 5B are example illustrations of a JavaScript Object Notation (JSON) structure 500 for a hybrid workload domain. The example JSON structure 500 includes entries for display (e.g., via the example user interface 210 of FIGS. 2-4) for an administrator (e.g., the example administrator 212 of FIG. 2). In the illustrated example, the JSON structure 500 includes an identifier 502, a name 504, a workload domain type 506, a virtual resource entry 508, and a bare metal resource entry 510. In the illustrated example, the JSON structure 500 includes one virtual resource entry 508 and one bare metal resource entry 510. Additionally or alternatively, the JSON structure 500 may include multiple virtual resource entries 508 and/or multiple bare metal resource entries 510. For example, if the workload domain includes three virtual servers and two bare metal servers, the JSON structure 500 may include three virtual resource entries 508 and two bare metal resource entries 510.

The identifier 502 of the illustrated example is a unique identifier for a workload domain. The name 504 of the illustrated example is a name given to the workload domain (e.g., by the administrator 212). The example workload domain type 506 indicates whether the workload domain is a virtual workload domain, a bare metal workload domain, or a hybrid workload domain. In the illustrated example, the workload domain is a hybrid workload domain, as indicated by the workload domain type 506. For example, because the workload domain includes both virtual resources and bare metal resources, the workload domain associated with the JSON structure 500 is a hybrid workload domain.

The virtual resource entry 508 and the bare metal resource 510 are illustrated in more detail in FIG. 5B. In the illustrated example of FIG. 5B, the virtual resource entry 508 includes twelve sub-entries and the bare metal resource entry 510 includes eleven sub-entries. In the illustrated example, the virtual resource entry 508 includes virtual compute resources 512. For example, the virtual compute resources 512 include values of the total compute resources of the virtual server (e.g., the virtual server corresponding to the virtual resource entry 508), compute resources of the virtual resources currently in use (e.g., for another application), and/or the compute resources of the virtual resources allocated to the hybrid workload domain associated with the identifier 502.

In the illustrated example, the virtual resource entry 508 includes virtual memory resources 514. For example, the virtual memory resources 514 include values of the total memory resources of the virtual server (e.g., the virtual server corresponding to the virtual resource entry 508), memory resources of the virtual resources currently in use (e.g., for another application), and/or the memory resources of the virtual resources allocated to the hybrid workload domain associated with the identifier 502. In the illustrated example, the virtual resource entry 508 includes virtual storage resources 516. For example, the virtual storage resources 516 include values of the total storage resources of the virtual server (e.g., the virtual server corresponding to the virtual resource entry 508), storage resources of the virtual resources currently in use (e.g., for another application), and/or the storage resources of the virtual resources allocated to the hybrid workload domain associated with the identifier 502.

The example virtual resource entry 508 further includes an example workload rack entry 518 to indicate a physical location (e.g., in a server rack) of hardware associated with the virtual server (e.g., hardware allotted for the virtual server), an example workload vCenter entry 520 to indicate the position of the virtual server in a virtual server managing software application, and an example workload host entry 522 to indicate a particular server chip and/or motherboard associated with the virtual server.

In the illustrated example, the bare metal resource entry 510 includes bare metal compute resources 524. For example, the bare metal compute resources 524 include values of the total compute resources of the bare metal server (e.g., the bare metal server corresponding to the bare metal resource entry 510), compute resources of the bare metal resources currently in use (e.g., for another application), and/or the compute resources of the bare metal resources allocated to the hybrid workload domain associated with the identifier 502.

In the illustrated example, the bare metal resource entry 510 includes bare metal memory resources 526. For example, the bare metal memory resources 526 include values of the total memory resources of the bare metal server (e.g., the bare metal server corresponding to the bare metal resource entry 510), memory resources of the bare metal resources currently in use (e.g., for another application), and/or the memory resources of the bare metal resources allocated to the hybrid workload domain associated with the identifier 502. In the illustrated example, the bare metal resource entry 510 includes bare metal storage resources 528. For example, the bare metal storage resources 528 include values of the total storage resources of the bare metal server (e.g., the bare metal server corresponding to the bare metal resource entry 510), storage resources of the bare metal resources currently in use (e.g., for another application), and/or the storage resources of the bare metal resources allocated to the hybrid workload domain associated with the identifier 502.

The example bare metal resource entry 510 further includes an example workload rack entry 530 to indicate a physical location of the bare metal server (e.g., in a server rack) and an example workload host entry 532 to indicate a particular server chip and/or motherboard associated with the bare metal server.

Figure 6:
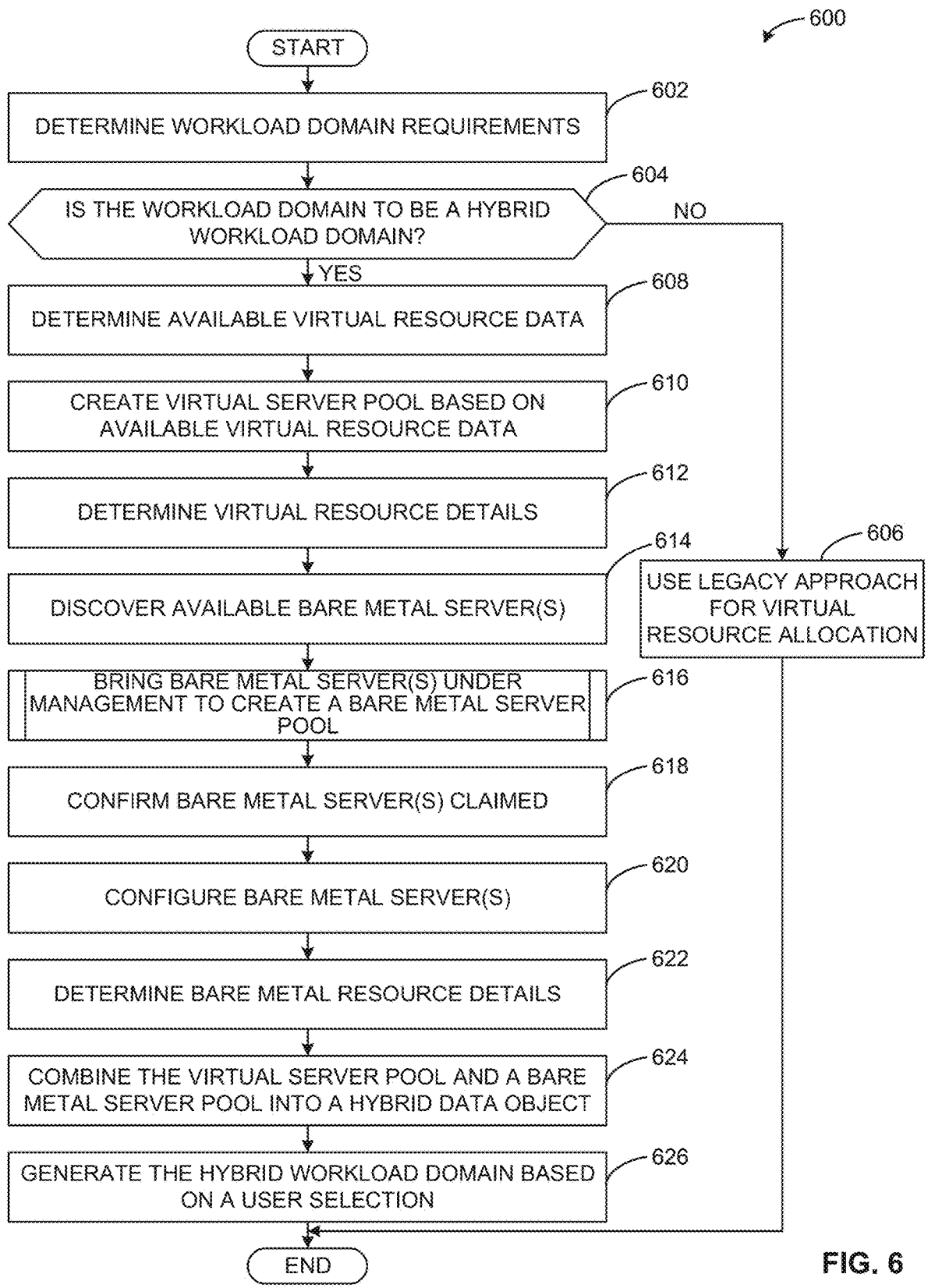
FIG. 6 is a flowchart representative of machine readable instructions which may be executed to implement the example workload domain manager of FIGS. 2 and/or 3 to generate a hybrid workload domain.
Figure 7:
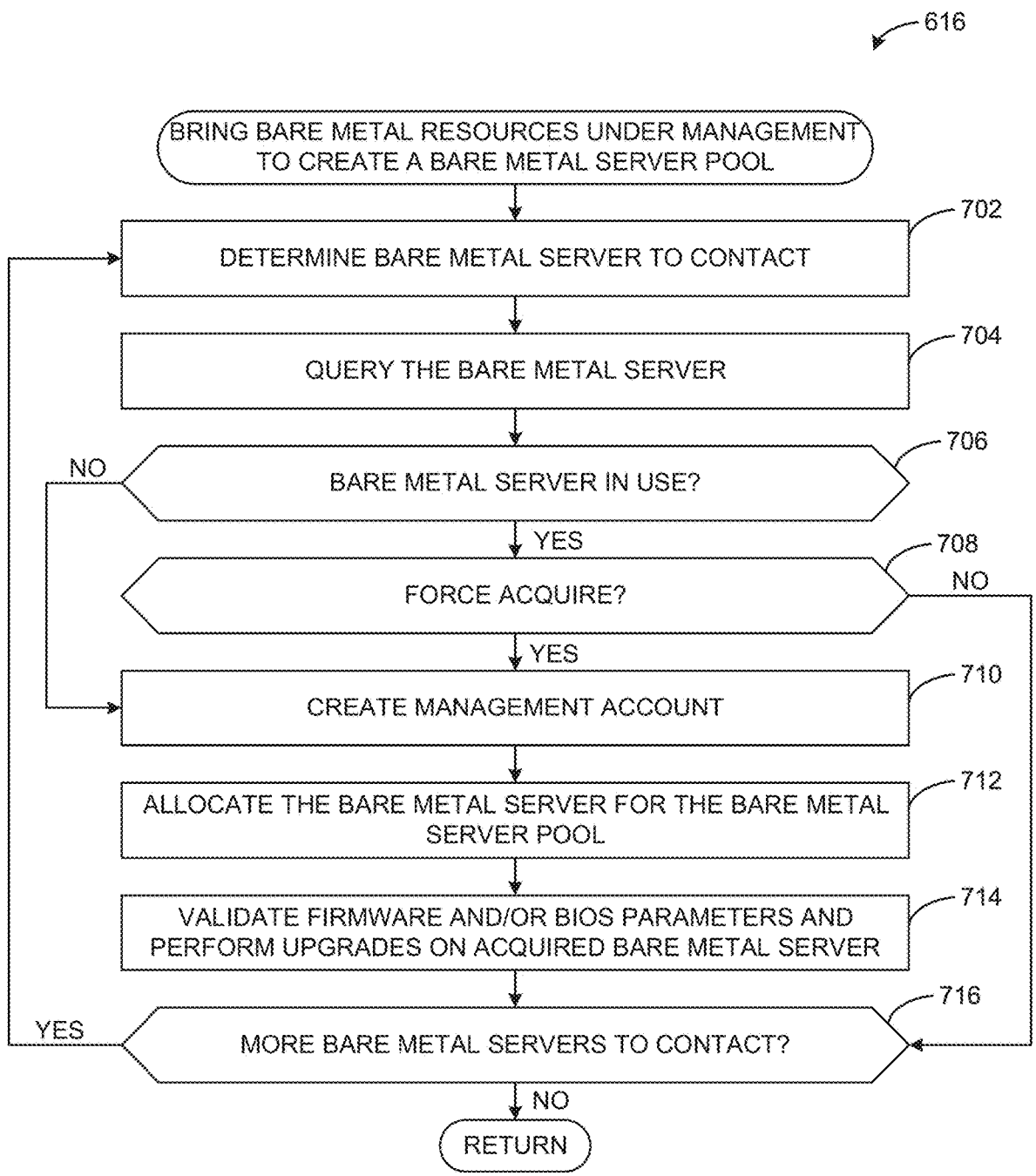
FIG. 7 is a flowchart representative of machine readable instructions which may be executed to implement the example workload domain manager of FIGS. 2 and/or 3 to bring bare metal resources under management to create a bare metal server pool.

Flowcharts representative of example hardware logic, machine readable instructions, hardware implemented state machines, and/or any combination thereof for implementing the workload domain manager 208 of FIG. 2 and/or 3 are shown in FIGS. 6 and 7. The machine readable instructions may be an executable program or portion of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 6 and 7, many other methods of implementing the example workload domain manager 208 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 6 and 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

FIG. 6 is a flowchart representative of machine readable instructions which may be executed to implement the example workload domain manager 208 of FIGS. 2 and/or 3 to generate a hybrid workload domain. The example process 600 begins at block 602 where the workload domain manager 208 determines workload domain requirements. For example, the workload domain manager 208 may receive input from an administrator (e.g., the administrator 212 of FIG. 2) via the example user interface 210 of FIGS. 2-4 regarding requirements for an application that is to be run using the resources of the workload domain. In such examples, the resource allocator 304 of FIG. 3 may receive the input and use the information when allocating resources.

At block 604, the workload domain manager 208 determines whether the workload domain is to be a hybrid workload domain. For example, the workload domain manager 208 may determine, based on the demands of the workload domain, whether an application is most effectively run using a combination of virtual resources and bare metal resources. For example, when the application demands constant, high demand for compute resources as well as scalability, the workload domain manager 208 determines that the workload domain is to be a hybrid workload domain. On the other hand, when the application demands scalability and flexibility, but not a high level of compute resources, the workload domain manager 208 determines that the workload domain is to be a legacy workload domain (e.g., a workload domain including only virtual resources). When the workload domain manager 208 determines that the workload domain is not to be a hybrid workload domain, control of process 600 proceeds to block 606. When the workload domain manager 208 determines that the workload domain is to be a hybrid workload domain, control of process 600 proceeds to block 608.

At block 606, the workload domain manager 208 uses a legacy approach for virtual resource allocation. For example, when the workload domain is not a hybrid workload domain, the workload domain manager 208 allocates virtual resources for the workload domain using known methods for virtual resource allocation. For example, the resource allocator 304 allocates virtual servers for the workload domain, and the virtual servers are used to run the application. When the virtual resources have been allocated by the workload domain manager 208, the process 600 concludes.

The workload domain manager 208 further determines available virtual resource data (block 608). For example, the resource discoverer 302 may query the example HMS 108, 114 to determine the virtual servers that are currently available and those that are currently in use (e.g., in another workload domain).

At block 610, the workload domain manager 208 creates a virtual server pool based on available virtual resource data. For example, the resource allocator 304 allocates the available virtual servers, or a portion of the available virtual servers (e.g., depending on demand of the application for virtual resources), to the virtual server pool. In some examples, the resource allocator 304 allocates all of the available virtual servers to the virtual server pool. In some alternative examples, the resource allocator 304 allocates a portion of the virtual servers to preserve the remaining virtual servers for use with future workload domains.

The workload domain manager 208 further determines virtual resource details (block 612). For example, the resource analyzer 306 of FIG. 3 requests information from the HMS 108, 114 regarding the allocated virtual servers. For example, the resource analyzer 306 may request information regarding compute resources available at each of the allocated virtual servers, the storage available at each of the virtual servers, and the memory of the virtual servers. In some examples, the information received by the resource analyzer 306 is stored in the database 310 of FIG. 3.

The workload domain manager 208 further discovers available bare metal servers (block 614). For example, the resource discoverer 302 may query physical resources (e.g., the physical resources 124, 126 of FIGS. 1-3) to determine whether the physical resources 124, 126 include available bare metal servers (e.g., the bare metal server 214 of FIG. 2). In some examples, the resource discoverer 302 transmits a message to the bare metal servers via the bare metal server interface 314 of FIG. 3 to determine the available bare metal servers. In some examples, the message is received by a microcontroller of the bare metal server 214, and the microcontroller may respond to the message to notify the resource discoverer 302 of whether the bare metal server 214 is available for use in a workload domain or is currently in use (e.g., in another workload domain).

At block 616, the workload domain manager 208 brings bare metal servers under management to create a bare metal server pool. For example, the resource allocator 304 may bring all of the available bare metal servers under management of the workload domain manager 208, creating a bare metal server pool (e.g., a collection of bare metal servers). In some examples, the resource allocator 304 brings a portion of the available bare metal servers under management, leaving additional bare metal servers to be used in future workload domains. In some alternative examples, the resource allocator 304 brings one or more bare metal servers that are unavailable under management of the workload domain manager 208. The bringing of the bare metal servers under management is discussed further in connection with process 616 of FIG. 7.

The workload domain manager 208 further confirms bare metals servers claimed (block 618). For example, after the resource allocator 304 has brought the bare metal servers under management, the resource allocator 304 may validate the claimed bare metal servers. In some examples, the resource allocator 304 requests authorization from the administrator 212 to take the bare metal servers under management. When the administrator 212 confirms that the workload domain manager 208 is to take the bare metal servers under management, the process 600 proceeds to block 620. If the administrator 212 does not confirm that the bare metal servers are to be taken under management, the administrator 212 may adjust the servers taken under management to be greater or fewer bare metal servers than were originally brought under management.

At block 620, the workload domain manager 208 configures the bare metal servers. For example, the resource allocator 304 may configure a network time protocol to sync a clock of the bare metal server 214 with the machine on which the workload domain manager 208 is operating. In some examples, the resource allocator 304 may configure a single sign-on (SSO) to allow the administrator 212 to log in to the software running on the bare metal server 214 when using the software operating the workload domain manager 208.

At block 622, the workload domain manager 208 determines bare metal resource details. In some examples, the resource analyzer 306 determines information regarding each of the bare metal servers brought under management. For example, the resource analyzer 306 of FIG. 3 requests information from the microcontrollers of the bare metal servers brought under management. For example, the resource analyzer 306 may request information regarding compute resources available at each of the allocated bare metal servers, the storage available at each of the bare metal servers, and the memory of the bare metal servers. In some examples, the information received by the resource analyzer 306 is stored in the database 310 of FIG. 3.

The workload domain manager 208 further combines the virtual server pool and the bare metal server pool into a hybrid server pool (block 624). For example, the hybrid workload domain generator 308 of FIG. 3 may combine the virtual server pool (e.g., the resources of the allocated virtual servers) with the bare metal server pool (e.g., the resources of the allocated bare metal servers) to create a hybrid server pool that includes both the virtual servers and the bare metal servers. In some examples, the hybrid server pool is displayed to the administrator 212 via the user interface 210. For example, the hybrid workload domain generator 308 may organize the hybrid server pool in a manner similar to that of FIG. 4, and the hybrid server pool may be displayed to the administrator 212 for selection in the user interface 210 (e.g., using the selection column 402).

At block 626, the workload domain manager 208 generates the hybrid workload domain based on a user selection. For example, the administrator 212 may select servers (e.g., virtual servers and/or bare metal servers) from the hybrid server pool displayed via the user interface 210. In some examples, the administrator 212 selects a combination of virtual servers and bare metal servers based on the information displayed in the user interface 210 (e.g., displayed in columns 404-412 of FIG. 4). When the administrator 212 makes selections in the user interface 210, the hybrid workload domain generator 308 generates the hybrid workload domain that is to be used to run the application for the administrator 212.

FIG. 7 is a flowchart representative of machine readable instructions which may be executed to implement the example workload domain manager 208 of FIGS. 2 and/or 3 to bring bare metal resources under management to create a bare metal server pool. The example process 616 begins at block 702 where the workload domain manager 208 determines a bare metal server (e.g., the bare metal server 214 of FIG. 2) to contact. For example, the resource discoverer 302 of FIG. 3 may contact a first bare metal server (e.g., the bare metal server 214) in a physical server rack (e.g., the physical resources 124, 126 of FIGS. 1-3).

The workload domain manager 208 further queries the bare metal server 214 (block 704). For example, the resource discoverer 302 may transmit a message over the bare metal server interface 314 of FIG. 3 to a microcontroller included at the bare metal server 214. In such an example, the microcontroller of the bare metal server 214 may respond to the message to notify the resource discoverer 302 as to whether the bare metal server 214 is currently in use. In some examples, the resource discoverer 302 queries the bare metal server 214 using an intelligent platform management interface (IPMI). In some such examples, the IPMI transmits the message over the example network 137 of FIG. 1 and/or 2 to the microcontroller of the bare metal server 214.

At block 706, the workload domain manager 208 determines whether the bare metal server 214 is in use. For example, the resource discoverer 302 may receive a response from the bare metal server 214 indicating that the bare metal server 214 is available for use by the workload domain manager 208. In such an example, control of the process 616 proceeds to block 708. Alternatively, when the resource discoverer 302 receives a response from the bare metal server 214 indicating that the bare metal server 214 is unavailable (e.g., in use for a different application), control of the process 616 proceeds to block 710.

The workload domain manager 208 further determines whether to force acquire the bare metal server 214 when the bare metal server 214 is in use (block 708). For example, the resource allocator 304 may determine whether a bare metal server 214 is to be acquired regardless of the fact that the bare metal server 214 is unavailable. In some examples, the resource allocator 304 requests input from an administrator (e.g., the administrator 212 of FIG. 2) to determine whether the bare metal server 214 is to be force acquired. When the workload domain manager 208 determines that the bare metal server 214 is to be force acquired, control of process 616 proceeds to block 710. When the workload domain manager 208 determines that the bare metal server 214 is not to be force acquired, control of the process 616 proceeds to block 716.

At block 710, the workload domain manager 208 creates a management account. For example, the resource allocator 304 may create a management account at the bare metal server 214 that is to be acquired. In some examples, the management account allows for control of the bare metal server 214 by the workload domain manager 208. When the workload domain manager 208 has determined to force acquire the bare metal server 214 (e.g., yes at block 708), the bare metal server 214 may already have a management account. In some examples, the management account is removed by the resource allocator 304, and a new management account is created at the bare metal server 214. Alternatively, in some examples, the resource allocator 304 may take control of the management account for use by the workload domain manager 208.

The workload domain manager 208 further allocates the bare metal server 214 for the bare metal server pool (block 712). For example, the resource allocator 304 may allocate the bare metal server 214 to a bare metal server pool when the management account has been created on the bare metal server 214. In such examples, the resource allocator 304 may further combine the resources of the bare metal server 214 with those of any bare metal servers previously acquired for the bare metal server pool. For example, the bare metal server pool may include several bare metal servers and the resources of each of the bare metal servers.

At block 714, the workload domain manager 208 validates firmware and/or basic input/output system (BIOS) parameters and performs upgrades on the acquired bare metal server (e.g., the bare metal server 214). For example, the resource analyzer 306 of FIG. 3 may request further information from the microcontroller of the acquired bare metal server 214 to determine firmware and/or BIOS parameters of the bare metal server 214. When the resource analyzer 306 receives the firmware and/or BIOS parameters, the resource analyzer 306 validates the settings. In some examples, the resource analyzer 306 further performs upgrades to the firmware or other settings on the bare metal server 214 to ensure the bare metal server 214 is up-to-date and capable of operating with the workload domain manager 208.

At block 716, the workload domain manager 208 determines whether there are more bare metal servers to contact. For example, the resource discoverer 302 may determine whether additional bare metal servers are included in the physical resources 124, 126 that may be brought under management of the workload domain manager 208. When the workload domain manager 208 determines that there are more bare metal servers to contact, control of the process 616 returns to block 702. When the workload domain manager 208 determines that there are no more bare metal servers to contract, control of process 616 returns to block 618 of the process 600 of FIG. 6.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 8:
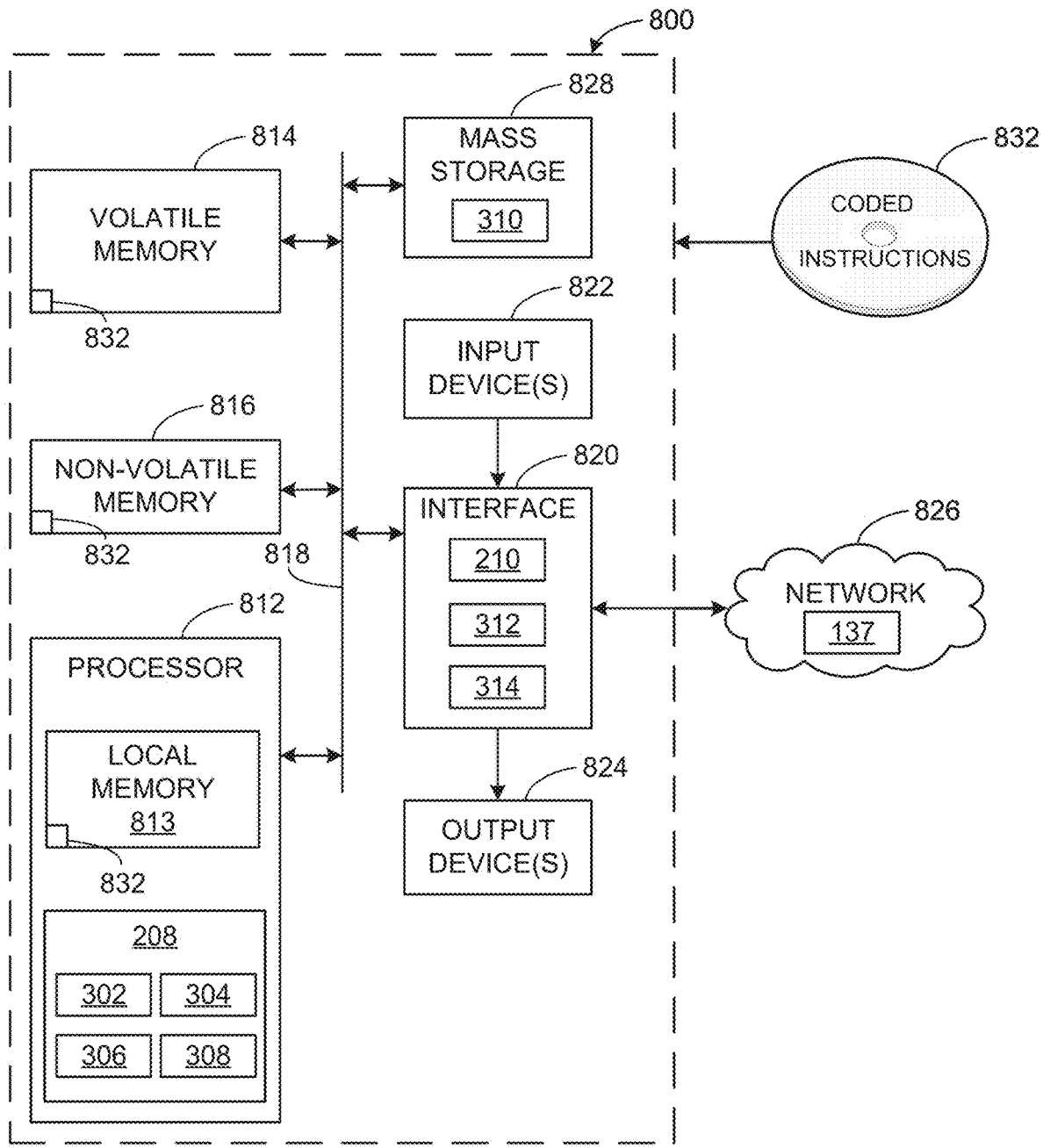
FIG. 8 is a block diagram of an example processing platform structured to execute the instructions of FIGS. 6 and/or 7 to implement the example workload domain manager of FIGS. 2 and/or 3.

FIG. 8 is a block diagram of an example processing platform structured to execute the instructions of FIG. 6 and/or 7 to implement the example workload domain manager 208 of FIG. 2 and/or 3. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example resource discoverer 302, the example resource allocator 304, the example resource analyzer 306, and the example hybrid workload domain generator 308 of FIG. 3.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. In the illustrated example, the network 826 includes the example network 137 of FIG. 1 and/or 2. The communication can be via, for example, an Ethernet connection, a digital subscriber line (DSL) connection, a telephone line connection, a coaxial cable system, a satellite system, a line-of-site wireless system, a cellular telephone system, etc. In the illustrated example, the interface circuit 820 implements the example user interface 210 of FIG. 2-4, and the example virtual server interface 312, and the example bare metal server interface 314 of FIG. 3.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives. In the illustrated example, the mass storage devices 828 include the example database 310 of FIG. 3.

The machine executable instructions 832 of FIGS. 6 and 7 may be stored in the mass storage device 828, in the volatile memory 814, in the non-volatile memory 816, and/or on a removable non-transitory computer readable storage medium such as a CD or DVD.

Examples disclosed herein create a hybrid workload domain that combines the ability of bare metal servers to deliver constant, high levels of compute resources with the scalability and flexibility of virtual servers. In some examples, the bare metal servers and the virtual servers are brought under control of a single program and a single administrator, thus making the operation of an application having several different requirements on the hybrid workload domain feasible.

The examples disclosed herein allow an administrator of the hybrid workload domain to manage all resources used for the application (e.g., virtual resources and bare metal resources) from a single program that provides a consolidated view of the hybrid workload domain configuration.

Further, the examples disclosed herein allow for utilization of all resources (e.g., types of resources or servers), enabling the demands of an application to be met using a single workload domain. The disclosed examples thus simplify management of the hybrid workload domain and troubleshooting of issues arising with the hybrid workload domain.

From the foregoing, it will be appreciated that example methods, apparatus and articles of manufacture have been disclosed that deploy a hybrid workload domain. The disclosed methods, apparatus and articles of manufacture improve the efficiency of using a computing device by increasing the versatility of a workload domain. For example, the hybrid workload domains included in the disclosed examples allow an administrator to run an application that demands not only a high, constant compute resource, but that also demands scalability and flexibility. By combining bare metal resources (e.g., to meet demands for high, constant compute resources) and virtual resources (e.g., to meet demands for scalability and flexibility) in a single, customizable workload domain, the disclosed examples increase the ability of a computer to manage and operate complex applications. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system comprising:
a hardware management system to manage physical hardware resources of a physical rack based on interfacing with the physical rack; and
a software defined data center manager to:
generate a virtual server rack based on physical hardware resources of the physical rack, the virtual server rack including virtual resources corresponding to an abstraction of the physical hardware resources of the physical rack;
determine whether a workload domain is to be a hybrid workload domain based on a demand of the workload domain, the demand corresponding to a request for compute resources indicative of physical hardware resources or virtual resources; and
generate the hybrid workload domain to run an application, the hybrid workload domain including the virtual resources and the physical hardware resources.

2. The system of claim 1, wherein the hardware management system is to periodically monitor a status and a health of the physical hardware resources based on in-band connectivity management.

3. The system of claim 1, further including a user interface to identify requirements of the application, the requirements corresponding to resources associated with the hybrid workload domain.

4. The system of claim 3, wherein the software defined data center manager is to identify, based on the requirements of the application, that the application is to include the virtual resources of the virtual server rack and physical resources of the physical rack.

5. The system of claim 1, further including a hypervisor to generate the virtual resources for the virtual server rack based on virtualizing the physical hardware resources of the physical rack.

6. The system of claim 1, wherein the software defined data center manager is to query the hardware management system to determine that the virtual resources of the virtual server rack are available for the application.

7. The system of claim 1, wherein the software defined data center manager is to query the hardware management system to determine that the physical hardware resources of the physical rack are available for the application.

8. The system of claim 7, wherein the software defined data center manager is to create a management account corresponding to the physical hardware resources, the management account to enable a control of the physical hardware resources at a software defined data center level to generate the hybrid workload domain.

9. An apparatus comprising:
means for managing physical hardware resources of a physical rack based on interfacing with the physical rack; and
means for generating to:
generate a virtual server rack based on the physical hardware resources of the physical rack, the virtual server rack including virtual resources corresponding to an abstraction of the physical hardware resources of the physical rack;
determine whether a workload domain is to be a hybrid workload domain based on a demand of the workload domain, the demand corresponding to a request for compute resources indicative of physical hardware resources or virtual resources; and
generate the hybrid workload domain to run an application, the hybrid workload domain including the virtual resources and the physical hardware resources.

10. The apparatus of claim 9, wherein the means for managing is to periodically monitor a status and a health of the physical hardware resources based on in-band connectivity management.

11. The apparatus of claim 9, further including a means for identifying requirements of the application, the requirements corresponding to resources associated with the hybrid workload domain.

12. The apparatus of claim 11, wherein the means for generating is to identify, based on the requirements of the application, that the application is to include the virtual resources of the virtual server rack and physical resources of the physical rack.

13. The apparatus of claim 9, further including a means for generating virtual resources for the virtual server rack based on virtualizing the physical hardware resources of the physical rack.

14. The apparatus of claim 9, wherein the means for generating is to query the means for managing to:
determine that the virtual resources of the virtual server rack are available for the application; and
determine that the physical hardware resources of the physical rack are available for the application.

15. The apparatus of claim 14, wherein the means for generating is to create a management account corresponding to the physical hardware resources, the management account to enable a control of the physical hardware resources at a software defined data center level to generate the hybrid workload domain.

16. A non-transitory computer readable storage medium comprising instructions that, when executed, cause one or more processors to at least:
manage physical hardware resources of a physical rack based on interfacing with the physical rack; and
generate a virtual server rack based on the physical hardware resources of the physical rack, the virtual server rack including virtual resources corresponding to an abstraction of the physical hardware resources of the physical rack;
determine whether a workload domain is to be a hybrid workload domain based on a demand of the workload domain, the demand corresponding to a request for compute resources indicative of physical hardware resources or virtual resources; and
generate the hybrid workload domain to run an application, the hybrid workload domain including the virtual resources and the physical hardware resources.

17. The non-transitory computer readable storage medium of claim 16, wherein the instructions, when executed, cause the one or more processors to periodically monitor a status and a health of the physical hardware resources based on in-band connectivity management.

18. The non-transitory computer readable storage medium of claim 16, wherein the instructions, when executed, cause the one or more processors to identify requirements of the application, the requirements corresponding to resources associated with the hybrid workload domain.

19. The non-transitory computer readable storage medium of claim 16, wherein the instructions, when executed, cause the one or more processors to query a hardware management system to:
determine that the virtual resources of the virtual server rack are available for the application; and
determine that the physical hardware resources of the physical rack are available for the application.

20. The non-transitory computer readable storage medium of claim 19, wherein the instructions, when executed, cause the one or more processors to create a management account corresponding to the physical hardware resources, the management account to enable a control of the physical hardware resources at a software defined data center level to generate the hybrid workload domain.

* * * * *